(12) United States Patent
Fowler et al.

(10) Patent No.: US 12,544,813 B2
(45) Date of Patent: Feb. 10, 2026

(54) UNWANTED PHARMACEUTICAL FORMULATION DISPOSAL SYSTEM AND MAILER

(71) Applicant: Verde Environmental Technologies, Inc., Minnetonka, MN (US)

(72) Inventors: William Virgil Fowler, Minneapolis, MN (US); Hayley Anne Wenda-Zilka, Monticello, MN (US); Nancy Elizabeth Devine, Eden Prairie, MN (US)

(73) Assignee: Verde Environmental Technologies, Inc., Minnetonka, MN (US)

( * ) Notice: Subject to any disclaimer, the term of this patent is extended or adjusted under 35 U.S.C. 154(b) by 0 days.

(21) Appl. No.: 18/929,114

(22) Filed: Oct. 28, 2024

(65) Prior Publication Data

US 2025/0050392 A1 Feb. 13, 2025

Related U.S. Application Data

(63) Continuation-in-part of application No. 18/201,699, filed on May 24, 2023.

(60) Provisional application No. 63/545,918, filed on Oct. 26, 2023, provisional application No. 63/405,608, filed on Sep. 12, 2022, provisional application No. 63/345,156, filed on May 24, 2022.

(51) Int. Cl.
*B09B 3/10* (2022.01)
*B09B 3/20* (2022.01)
*B09B 101/65* (2022.01)

(52) U.S. Cl.
CPC ............. *B09B 3/10* (2022.01); *B09B 3/20* (2022.01); *B09B 2101/65* (2022.01)

(58) Field of Classification Search
CPC .... B09B 3/00; B09B 3/10; B09B 3/20; B09B 2101/65
See application file for complete search history.

(56) References Cited

U.S. PATENT DOCUMENTS

| 4,000,846 | A |   | 1/1977  | Gilbert |
|-----------|---|---|---------|---------|
| 4,122,993 | A |   | 10/1978 | Glas |
| 4,369,882 | A | * | 1/1983  | Schluger ............... B65D 75/28 |
|           |   |   |         | 206/459.5 |
| 5,234,957 | A |   | 8/1993  | Mantelle |
| 8,979,724 | B2|   | 3/2015  | Fowler et al. |

(Continued)

FOREIGN PATENT DOCUMENTS

| GB | 2577666 A    | 4/2020 |
| WO | 1990006066 A1| 6/1990 |

OTHER PUBLICATIONS

Partial screenshot from https://deterrasystem.com/company/ accessed Dec. 16, 2024 (Year: 2024).*

(Continued)

*Primary Examiner* — Janine M Kreck
(74) *Attorney, Agent, or Firm* — Winthrop & Weinstine, P.A.

(57) ABSTRACT

Systems and methods that an individual may use for disposing of unwanted pharmaceutical formulation. More specifically, systems and methods that an individual may use for disposing of unwanted pharmaceutical formulations that include receiving a disposal container including a pharmacological agent activity mitigation component and combining the unwanted pharmaceutical formulation with the pharmacological agent activity mitigation component in the disposal container are provided. The systems and method may further include a direct mail mailer for sending the disposal container and pharmacological agent activity mitigation component to the user.

9 Claims, 12 Drawing Sheets

(56) References Cited

U.S. PATENT DOCUMENTS

| | | | |
|---|---|---|---|
| 11,389,844 | B2 | 7/2022 | Fowler |
| 2006/0260973 | A1 | 11/2006 | Macinnes et al. |
| 2009/0134054 | A1 | 5/2009 | Lee et al. |
| 2009/0180936 | A1* | 7/2009 | Anderson ............ A61K 31/445 422/129 |
| 2012/0088951 | A1 | 4/2012 | Deryck et al. |
| 2014/0235917 | A1 | 8/2014 | Best |
| 2017/0253381 | A1* | 9/2017 | Van Erlach ............ B65D 85/70 |
| 2018/0071046 | A1 | 3/2018 | Foos et al. |
| 2019/0291152 | A1 | 9/2019 | Fowler |
| 2022/0314287 | A1 | 10/2022 | Fowler |
| 2023/0405650 | A1 | 12/2023 | Fowler |

OTHER PUBLICATIONS

Partial screenshot from https://www.youtube.com/watch?v=Xgqc2FWTkas accessed Dec. 16, 2024 (Year: 2020).*

Partial screenshot from https://www.facebook.com/deterrasystem/videos/request-a-free-deterra-pouch/1167337340691394/ accessed Dec. 16, 2024 (Year: 2022).* https://www.youtube.com/watch?v=V1RxmAMWKOU How to Deactivate Pills, Liquids, Creams and Films with Deterra accessed Mar. 13, 2025 (Year: 2019).* https://morevang.com/postage-101-first-class-vs-marketing-mail/ Postage 101: First-Class vs. Marketing Mail—More Vang accessed Mar. 13, 2025 (Year: 2022).* https://pe.usps.com/text/dmm300/201.htm#ep1096362 Domestic Mail Manual 200 Commercial Letters, Flats, and Parcels Design Standards | Postal Explorer.* https://pe.usps.com/text/dmm300/201.htm#ep 1096362 Domestic Mail Manual 200 Commercial Letters, Flats, and Parcels Design Standards | Postal Explorer (Year: 2025).*

International Search Report and Written Opinion in International Appin. No. PCT/US2023/066098, mailed on Aug. 14, 2023, 14 pages.

International Search Report and Written Opinion in International Appin. No. PCT/US2023/023433, mailed on Sep. 5, 2023, 17 pages.

\* cited by examiner

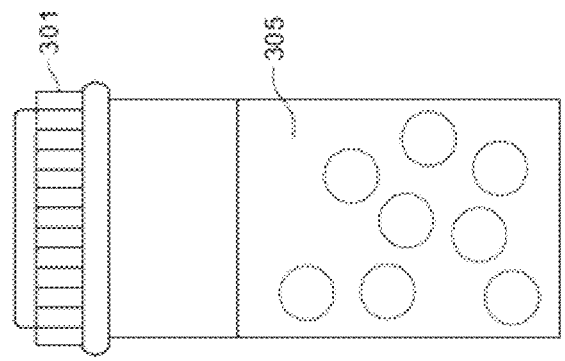
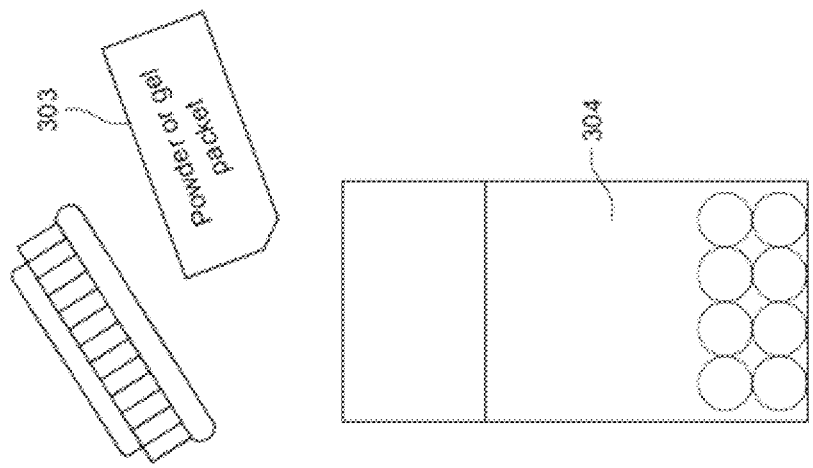
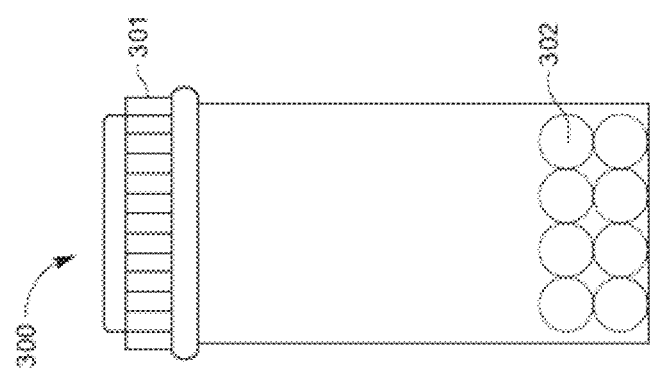

UNWANTED PHARMACEUTICAL FORMULATION DISPOSAL SYSTEM AND MAILER

CROSS-REFERENCE TO RELATED APPLICATIONS

This application claims the benefit of and priority to U.S. Provisional Patent Application No. 63/545,918, filed 26 Oct. 2023; this application is also a continuation-in-part of U.S. patent application Ser. No. 18/201,699, filed 24 May 2023, which claims the benefit of and priority to U.S. Provisional Patent Application Ser. Nos. 63/345,156 filed 24 May 2022 and 63/405,608 filed 12 Sep. 2022; the disclosures of each of which are herein incorporated by reference in their entireties.

FIELD OF THE INVENTION

The present application is directed to systems and methods for disposing of unwanted pharmaceutical formulations. More specifically, the present application is directed to systems and methods that an individual may use for disposing of unwanted pharmaceutical formulations. Even more specifically, the present application is directed to systems and methods that that an individual may use for disposing of unwanted pharmaceutical formulations, the systems and methods including combining the unwanted pharmaceutical formulation with a pharmacological agent activity mitigation component in a disposal container, placing the disposal container in a delivery package, and shipping the delivery package for disposal. The combining and packaging steps may be performed by a subject prescribed the pharmaceutical formulation or an agent thereof (such as a spouse or caregiver). The disposal container may be preloaded with the pharmacological agent activity mitigation component and may be mailed to the person disposing of the unwanted pharmaceutical formulation using a direct mail mailer. The direct mail mailer may comprise or may include a housing that complies with United States Postal Service requirements for an automation flat.

BACKGROUND OF THE INVENTION

There is an ongoing concern about how to dispose of unwanted pharmaceutical formulations. These pharmaceutical formulations may comprise prescription medications for which there is no longer use because the consumer to whom the prescription medication was prescribed no longer needs the medication or needs a new dosage of the medication, or the prescription medication is expired. Other unwanted pharmaceutical formulations may comprise illegal narcotics.

The temptation and potential for prescription drug abuse, and particularly, abuse of narcotics and other controlled substances is well known. There is a widespread abuse issue that is exemplified by the current problems associated with opioids such morphine, oxycontin, fentanyl, codeine, and many others. A consumer prescribed a controlled substance such as an opioid, who no longer needs or wants the medication can struggle with what to do with the excess medication. It is not advisable to keep such medication available at a house and it can be intimidating to determine how to dispose of such medication.

A significant source of pharmaceutical environmental contamination lies with disposal of unused or expired medications (See e.g., eMedicineHealth Mar. 21, 2008). Historically, these medications are flushed down the toilet or thrown into the trash, with a likely outcome that they will eventually end up in groundwater supplies. The only medications that the FDA condones flushing down the toilet are controlled substances with abuse potential (and then only because the risk of abuse is considered to outweigh the risk to the environment).

According to a recent investigative report by the Associated Press, Americans flush 250 million pounds of pharmaceuticals down the drain every year (reference: Living on Earth.org online interview with the EPA, Oct. 3, 2008). This practice of pharmaceutical composition disposal has resulted in contamination of the drinking water supply of numerous major cities throughout the United States (See e.g., Air Force Print News Today, Mar. 24, 2008).

Contaminants from unwanted pharmaceutical formulations pose risks to the environment, affecting people, fish and wildlife. Potential problems include abnormal physiological processes, reproductive impairment, increased evidence of cancer, and development of anti-microbial resistant organisms (See e.g., Kansas Dept of Health and Environment, Mar. 22, 2007).

A need thus exists for a safe and easy system and method for disposing of unwanted pharmaceutical formulations. More specifically, a need exists for a safe and easy system and method that can be used by an individual to dispose of unwanted pharmaceutical formulations.

BRIEF SUMMARY OF THE INVENTION

Systems and methods for disposing of an unwanted pharmaceutical formulation are provided. In some embodiments, a system for disposing of an unwanted pharmaceutical formulation and for providing such system to a user comprising a disposal container, a pharmacological agent activity mitigation component, and a direct mail mailer is provided. The direct mail mailer meets the requirements for a United States Postal Service automation flat.

The pharmacological agent activity mitigation component may be activated carbon. The activated carbon may be provided in a carrier. The carrier may be water soluble or water permeable. More specifically, the carrier may be a water soluble pod. In another embodiment, the pharmacological agent activity mitigation component may comprise a sequestering agent.

The disposal container may be a pouch and the pouch may be preloaded with the pharmacological agent activity mitigation component. The pouch may have a zipper type seal, an adhesive seal, or other suitable seal.

The direct mail mailer may comprise cardstock and an overwrap. Alternatively, the direct mail mailer may comprise a tray having one or more receptacles for receiving the disposal container and/or the pharmacological agent activity mitigation component. The tray may comprises flexion points along one or more edges thereof. In one embodiment, a flexion point is provided along each edge of the tray, such as midway along the edges of the tray. The direct mail mailer may further comprise an overwrap.

In further embodiments, a method of disposing of an unwanted pharmaceutical formulation is provided. The method may comprise receiving a disposal container and a pharmacological agent activity mitigation component, wherein receiving comprises receiving a direct mail mailer housing the disposal container, wherein the direct mail mailer meets the requirements for a United States Postal Service automation flat, combining the unwanted pharmaceutical formulation and the pharmacological agent activity mitigation component in the disposal container, and sealing the disposal container. The method may further include adding liquid to the unwanted pharmaceutical formulation and the pharmacological agent activity mitigation component in the disposal container.

The pharmacological agent activity mitigation component may comprise activated carbon or a sequestering agent. The pharmacological agent activity mitigation component may be provided in a carrier such as a water soluble or water permeable pod. The direct mail mailer may comprise a tray and/or cardstock.

In a further embodiment, a system for disposing of an unwanted pharmaceutical formulation and for providing such system to a user is provided comprising a disposal container, a pharmacological agent activity mitigation component and a direct mail mailer. The disposal container may be a pouch, such as a sealable pouch. The pharmacological agent activity mitigation component may be an activated carbon pod. The direct mail mailer meets the requirements for a United States Postal Service automation flat and may be a tray having one or more flexion points.

In yet a further embodiment, a system for disposing of an unwanted pharmaceutical formulation and for providing such system to a user is provided comprising a pharmacological agent activity mitigation component and a direct mail mailer. The pharmacological agent activity mitigation component may be a sequestering agent. The direct mail mailer meets the requirements for a United States Postal Service automation flat and may be a cardstock mailer.

BRIEF DESCRIPTION OF THE DRAWINGS

FIG. 3A illustrates a disposal container having an unwanted pharmaceutical formulation therein, in accordance with one embodiment.

FIG. 3B illustrates adding a pharmaceutical mitigation component to the disposal container of FIG. 3A, in accordance with one embodiment.

FIG. 3C illustrates the disposal container of FIG. 3B having the unwanted pharmaceutical formulation and the pharmaceutical mitigation component therein, in accordance with one embodiment.

DETAILED DESCRIPTION

Figure 1:
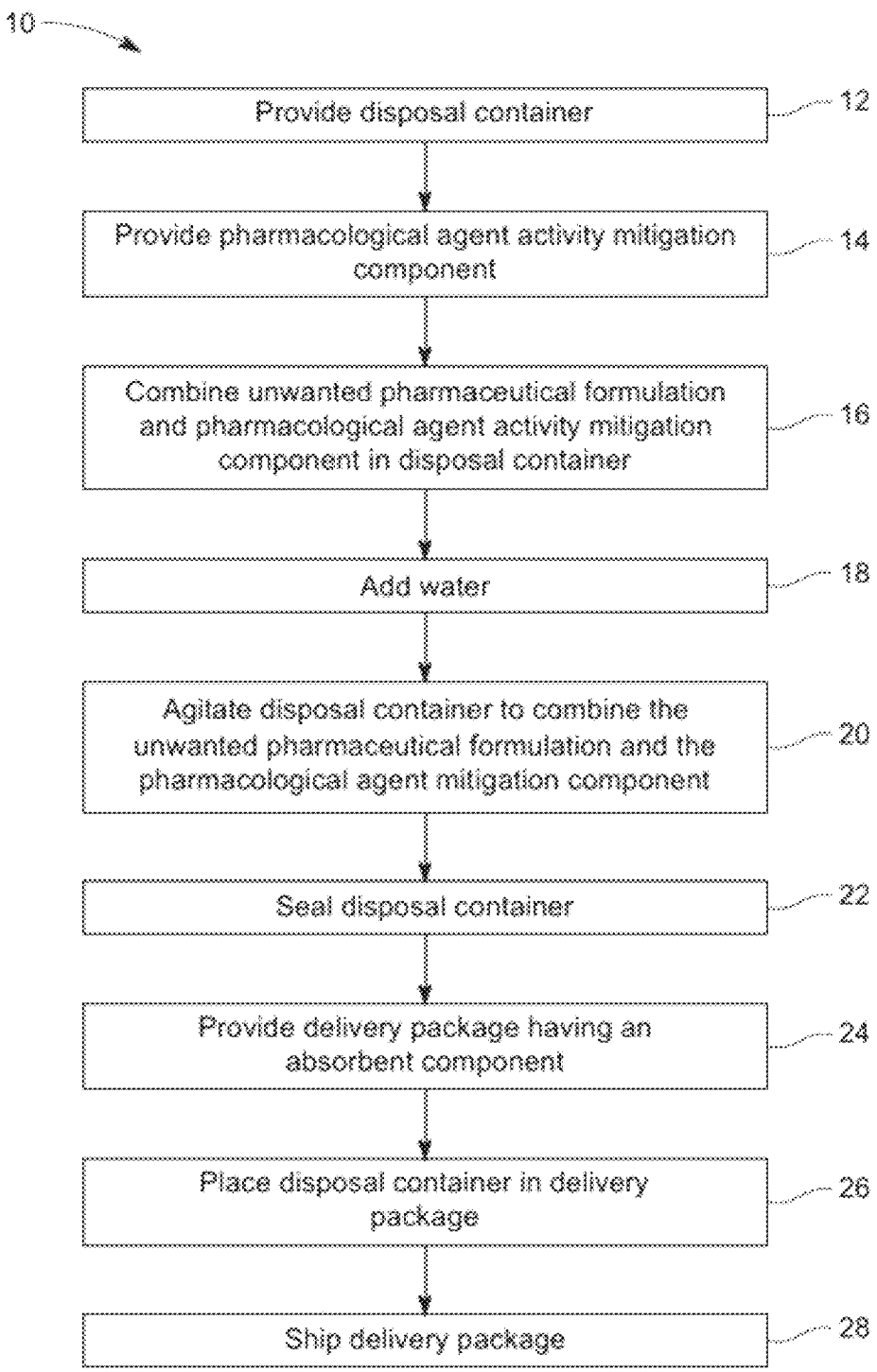
FIG. 1 illustrates a method for disposing of an unwanted pharmaceutical formulation, in accordance with one embodiment.

The present application is directed to systems and methods for disposing of unwanted pharmaceutical formulations. More specifically, the present application is directed to systems and methods that an individual may use for disposing of unwanted pharmaceutical formulations. Even more specifically, the present application is directed to systems and methods that that an individual may use for disposing of unwanted pharmaceutical formulations, the systems and methods including combining the unwanted pharmaceutical formulation with a pharmacological agent activity mitigation component in a disposal container, placing the disposal container in a delivery package, and shipping the delivery package for disposal. The combining and packaging steps may be performed by a subject prescribed the pharmaceutical formulation or an agent thereof (such as a spouse or caregiver). The disposal container may be preloaded with the pharmacological agent activity mitigation component and may be mailed to the person disposing of the unwanted pharmaceutical formulation using a direct mail mailer. The direct mail mailer may comprise or may include a housing that complies with United States Postal Service requirements for an automation flat.

Unwanted pharmaceutical formulations are compositions that include an active pharmaceutical ingredient ("API") but which are no longer wanted or needed and for which disposal is desired. Unwanted pharmaceutical formulations may be pharmaceutical formulations that were initially prescribed to a subject but are no longer needed or wanted by the subject, for example because the subject no longer suffers from a condition for which the pharmaceutical formulations were prescribed, the subject needs a new dosage, or the pharmaceutical formulations are expired. Unwanted pharmaceutical formulations may be unit dosage formulations (such as pills, tablets, etc.), may be liquid formulation, may be topical formulations, or may be any other type of pharmaceutical formulation.

A disposal system for sending to a user for disposing of an unwanted pharmaceutical formulation is provided. The disposal system may comprise a disposal container and a pharmacological agent activity mitigation component. The disposal container and the pharmacological agent activity mitigation component may be sent to the user via a direct mail mailer that may be configured to comply with United States Postal Service requirements for an automation flat.

In other embodiments, the disposal system may include a delivery package for the user to package the disposal container and send the unwanted pharmaceutical formulation to a emote facility for disposal of the unwanted pharmaceutical formulation.

The disposal container is configured for receiving the unwanted pharmaceutical formulation, the pharmacological agent activity mitigation component, and a liquid. In some embodiments, the disposal container comprises a sealable, liquid impermeable pouch or bottle. In other embodiments, the disposal container may be a dosage container (or pharmaceutical composition container) in which the unwanted pharmaceutical formulation was packaged for receipt by a subject.

The pharmacological agent activity mitigation component (sometimes referred to as a mitigation agent or mitigation component) may comprise an adsorption agent, a binding agent, and/or a sequestering agent. The pharmacological agent activity mitigation component may be provided in a carrier, such as a carrier comprising a water soluble polymeric film.

Various embodiments of direct mail mailers (for mailing to a user) and delivery packages (for mailing to a remote facility for disposal of the unwanted pharmaceutical formulation) are disclosed.

In one embodiment, the delivery package includes a base package, an absorption component, and, optionally, a pre-addressed and/or prepaid shipping label and/or tracking indicia. The delivery package may further include a liquid impermeable component.

In some embodiments, the direct mail mailer, the disposal container, and the pharmacological agent activity mitigation component are configured such that the direct mail mailer, with the disposal container and pharmacological agent activity mitigation component provided therein, complies with United States Postal Service requirements for an automation flat.

The cost of shipping products, such as kits for disposing of unwanted pharmaceutical formulations, is a significant cost to companies providing such kits. Companies can reduce their out of pocket shipping costs by taking advantage of the United States Postal Service pricing for commercial flats. More specifically, low automation prices are available for large envelops (flats) that are compatible with USPS automated processing equipment. To date, products such as kits for disposing of unwanted pharmaceutical formulations have not been shipped as a flat because of concern of compromising one or more components of the kit. A commercial flat is processed through a machine that can exert pressure on the contents of the flat. As a result, if force is not distributed well or if the flat buckles under pressure, the contents of the flat may have undergo high level of pressure In one embodiment, to form the direct mail mailer, an address sheet is folded over a pouch disposal container containing the pharmacological agent activity mitigation component (such as pods), and an overwrap is placed thereover to secure the pouch disposal container within the address sheet. The address sheet may comprise a sheet of cardstock.

In another embodiment, the direct mail mailer may comprise a tray. The tray may have a receptacle for receiving a pouch disposal container. Indents or flexion points may be provided along one or more edges of the tray. In use, a pouch disposal container containing pods is placed in the receptacle. An address sheet is placed thereover and tray, pouch, and address sheet are secured with an overwrap.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Method

Methods of disposing of an unwanted pharmaceutical formulation comprise mixing the unwanted pharmaceutical formulation and a pharmacological agent activity mitigation component in a disposal container to produce a contained/mitigated unwanted pharmaceutical formulation and placing the disposal container in a delivery package for shipping to a remote facility for disposal of the unwanted pharmaceutical formulation, wherein the combining and packaging steps are performed by a subject prescribed the pharmaceutical formulation (or an agent thereof such as a spouse or caregiver).

The invention further provides for a cost effective method of packaging the pharmacological agent activity mitigation component and disposal container for shipping to a user without compromising the integrity of either the pharmacological agent activity mitigation component or the disposal container.

FIG. 1 is a flowchart illustrating an overview of a method 10 for disposing of an unwanted pharmaceutical formulation. The method may include providing a disposal container 12, providing a pharmacological agent activity mitigation component 14, and combining the unwanted pharmaceutical formulation and the pharmacological agent activity mitigation component in disposal container 16. The method further comprising adding water to the disposal container 18 and agitating the disposal container to combine the unwanted pharmaceutical formulation and the pharmacological agent mitigation component 20. In some embodiments, the disposal container may be pre-loaded with a liquid and water may not be added. In other embodiments, no liquid may be used. The disposal container is sealed 22. The method further comprises providing a delivery package 24, placing the disposal container in the delivery package 26, and shipping the delivery package 28. The delivery package may include an absorbent component.

Providing the disposal container 12 and providing a pharmacological agent activity mitigation component 14 may comprise mailing the disposal container and pharmacological agent activity mitigation component to a user.

Mailing may be done using a direct mail mailer wherein the direct mail mailer, disposal container, and pharmacological agent activity mitigation component are sized and configured such that the direct mail mailer, when housing the disposal container and pharmacological agent activity mitigation component, complies with United States Postal Service requirements for an automation flat.

Aspects of placing the disposal container in the delivery package may vary depending on the configuration of the disposal container and/or the configuration of the delivery package.

In some embodiments, wherein the pharmacological agent activity mitigation component is provided present in a disposal container, the unwanted pharmaceutical formulation may be introduced into the disposal container. This may include removing the unwanted pharmaceutical formulation from a dosage container (the pharmaceutical composition container the pharmaceutical formulations were originally received in by the subject) prior to placing it in the disposal container. In other embodiments, wherein the unwanted pharmaceutical formulation is present in a dosage container, the dosage container may comprise the disposal container and the pharmacological agent activity mitigation component may be introduced into the dosage container. In embodiments wherein neither the unwanted pharmaceutical formulation nor the pharmacological agent activity mitigation component are initially present in the disposal container, the method may include positioning both the unwanted pharmaceutical formulation and the pharmacological agent activity mitigation component into the disposal container.

In embodiments for disposal of an unwanted pharmaceutical formulation provided in a blister pack, the blister pack and the pharmacological agent activity mitigation component may combined in a disposal container. In such embodiments, the blister pack may have at least one water soluble surface such that dissolution of the surface frees unwanted pharmaceutical formulations packaged therein for contact by the pharmacological agent activity mitigation component.

In some embodiments, following placement of an unwanted pharmaceutical formulation and a pharmacological agent activity mitigation component in a disposal container, an amount of liquid, such as water, may be introduced into the disposal container such that the pharmaceutical composition and active agent thereof combines with the pharmacological agent activity mitigation component. The amount of liquid that is introduced into the disposal container may vary, and in some instances is an amount sufficient to occupy 10% or more of the void space of the container, such as 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, 95% or more, including up to 100% of the void space of the disposal container. The liquid may be introduced into the container in any suitable manner, such as holding an opening of the container under a tap.

After placement of an unwanted pharmaceutical formulation and a pharmacological agent activity mitigation component in a disposal container, and introduction of any desired liquid into the disposal container, the disposal container may be sealed. The disposal container may be sealed using any convenient protocol, which may depend in part on the nature of the disposal container. For example, in embodiments wherein the disposal container includes a zipper type seal (such as those made by ZIPLOC®), this step may include sealing the zipper type seal by compressing the components of the seal together from one side of the seal to the other. In embodiments wherein the seal is an adhesive seal, this step may include pressing the adhesive components of the seal together. In other embodiments wherein the closure is a cap, sealing may include capping an opening of the disposal container. In some embodiments, the seal may be a tamper evident seal or may include a tamper evident label.

In some embodiments, the contents of the disposal container may be physically manipulated to facilitate mixing, e.g., by agitating the disposal container, manipulating the disposal container if the container is flexible, etc. In other embodiments, the method does not comprise deliberate physical manipulation of the disposal container.

In some embodiments, the disposal container having the unwanted pharmaceutical formulation and the pharmacological agent activity mitigation component therein may be maintained for a storage period prior to ultimate disposal of the disposal container, e.g., in a municipal sanitation system or the remote location to which the delivery package holding the container is sent. For example, the disposal container may be stored for a period ranging from 1 day to several weeks to several months. During storage, the disposal container may be maintained at any suitable temperature, including, for example, room temperature.

After combining the unwanted pharmaceutical formulation and pharmacological agent activity mitigation component in a disposal container, the disposal container may be placed in a delivery package. In some embodiments, positioning the disposal container in the delivery package may comprise merely placing the disposal container in the delivery package without regard to exact position. In other embodiments, positioning the disposal container in the delivery package may be done in a manner such that the absorbent component is in a specific position to prevent liquid escaping from the disposal container from exiting the interior of the delivery package. The delivery package may be liquid impermeable and, in some embodiments, may include an absorbent component. The delivery package is prepared for shipment, such as by applying address labels and postage. In some embodiments, the delivery package may be received by the subject pre-addressed and prepaid (e.g., with the necessary postage stamps pre-applied). The delivery package is sealed. The seal may be a tamper evident seal. The delivery package holding the disposal container is then given to a shipper by which the delivery package is configured to be shipped.

Disposal of the unwanted pharmaceutical formulation may be performed by a subject prescribed the pharmaceutical formulation or an agent thereof e.g., spouse, caregiver, etc. "An agent thereof" refers to a person acting on behalf of or as a representative of the subject prescribed the pharmaceutical formulation. In other words, the agent of the subject prescribed the pharmaceutical formulation is not merely acting in the interests of the subject, the agent is acting as a proxy for the subject. For instance, the agent of the subject is not acting on behalf of the companies, institutions, or persons involved with prescribing, manufacturing, or dispensing the pharmaceutical formulation to the subject. In some embodiments, the agent of the subject prescribed the pharmaceutical formulation is a family member of the subject such as a sibling, parent, grandparent, child, cousin, aunt, or uncle. In other embodiments, the agent of the subject is the subject's spouse. In other embodiments, the agent of the subject is a caregiver of the subject such as a paid or unpaid member of the subject's social network who helps them with activities of daily living.

The combining and packaging steps can be performed by the subject prescribed the pharmaceutical formulation. Alternatively, the combining and packaging steps can be performed by an agent of the subject prescribed the pharmaceutical formulation, such as when the subject is unwilling or unable to perform any or all of the combining and packaging steps. In some embodiments, the agent performs the combining and packaging steps at the explicit or implicit instruction of the subject.

The subject and/or the agent of the subject are likely not hospital or pharmacy workers (e.g., a doctor, pharmacist, or nurse) involved with prescribing, manufacturing, or dispensing the pharmaceutical formulation to the subject. Accordingly, the subject and/or agent of the subject may not have knowledge of how to properly dispose of unwanted pharmaceutical formulations and/or how to mail unwanted pharmaceutical formulations.

Discussion will now be made of examples disposing of an unwanted pharmaceutical formulation by providing a disposal container and pharmacological agent, mixing the unwanted pharmaceutical formulation with the pharmacological agent activity mitigation component in the disposal container, and, optionally, shipping the disposal container in a delivery package. The examples are of specific embodiments for carrying out disposal of unwanted pharmaceutical formulations. These are for illustrative purposes only, and are not intended to limit the scope of the invention.

After the examples, detail will be given about each aspect of the system and method.

Disposal Containers and Pharmacological Agent Activity Mitigation Components

Flexible Pouch Disposal Container and Activated Carbon Mitigation Component

In one example, a disposal container comprising a water impermeable sealable pouch dimensioned 5×9" is provided. The disposal container is preloaded with an amount of activated carbon sufficient to treat unused and to be disposed of unwanted pharmaceutical formulation tablets. The preloaded disposal container may be one such as provided by Verde Environmental Technologies, Inc., Minneapolis, MN. During use, unused pharmaceutical formulation tablets are placed in the pouch along with a volume of water sufficient to immerse the tablets.

Figure 2C:
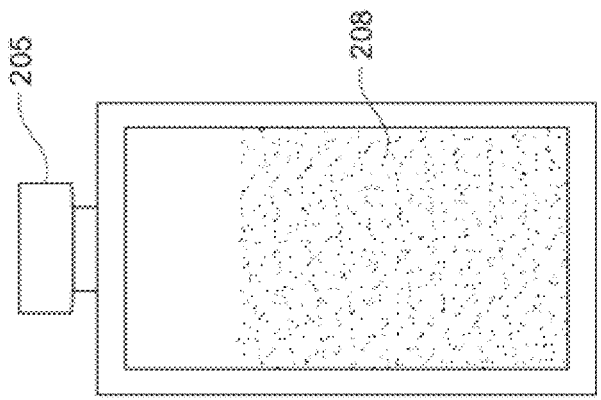
FIG. 2C illustrates the disposal container of FIG. 2B with the contents mixed and the container sealed, in accordance with one embodiment.
Figure 2B:
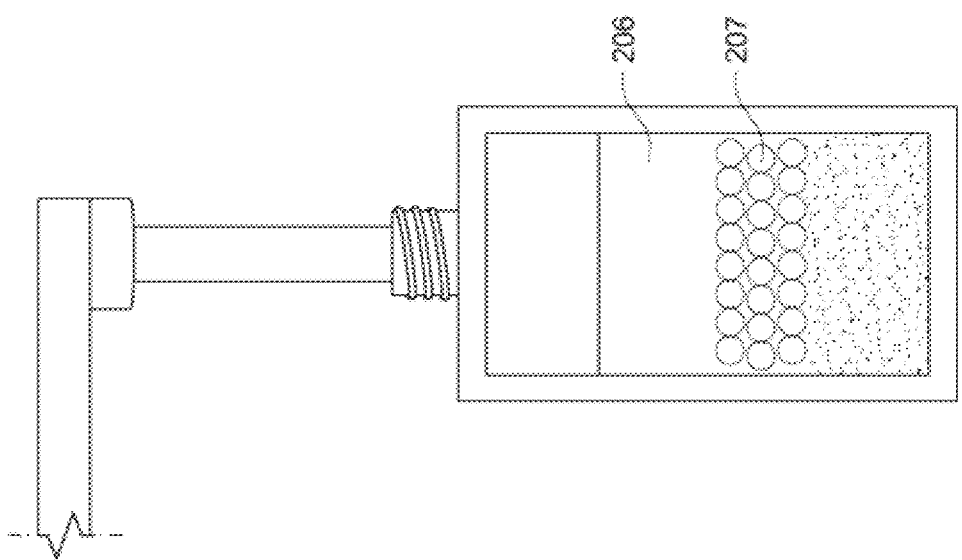
FIG. 2B illustrates the disposal container of FIG. 2A further housing an unwanted pharmaceutical formulation and a liquid, in accordance with one embodiment.
Figure 2A:
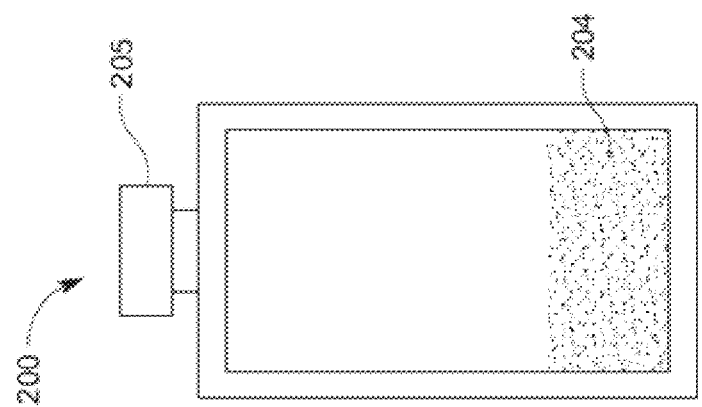
FIG. 2A illustrates a disposal container housing a pharmaceutical mitigation component, in accordance with one embodiment.

FIGS. 2A to 2C illustrate the aspects of a method for disposal of an unwanted pharmaceutical formulation using a pouch disposal container, in accordance with one embodiment. More specifically, FIGS. 2A to 2C illustrate the introduction of water is into a pouch disposal container such that a pharmaceutical composition and active agent thereof combine with the pharmacological agent activity mitigation component. FIG. 2A illustrates a disposal container comprising a water impermeable scalable pouch 200 having a removable twist off cap 205 (which cap may include a vent, as desired) sealing the pouch. A pharmacological agent activity mitigation component is provided in an interior of the disposal container. As shown in FIG. 2A, in this embodiment free-flowing activated carbon 204 is provided in the interior of the pouch 200. In FIG. 2B, the removable cap is removed, and an unwanted pharmaceutical formulation is introduced to the interior of the disposal container. More specifically, tablets 207 containing an active pharmaceutical ingredient are positioned inside of the pouch. Liquid is added to the interior of the disposal container to facilitate combining of the unwanted pharmaceutical formulation and the pharmacological agent activity mitigation component. For example, as shown in FIG. 2B, the pouch 200 may be positioned under a tap, and the tap is turned on in order to introduced water 206 into the interior of the pouch. FIG. 2C illustrates the pouch 200 containing a mixture 208. Creation of such mixture 208 may be facilitated by gently shaking the pouch, releasing the active agents from the unused tablets which are then adsorbed by the activated carbon. The pouch is then resealed by replacing the removable cap 205 onto the neck of the pouch.

Figure 2D:
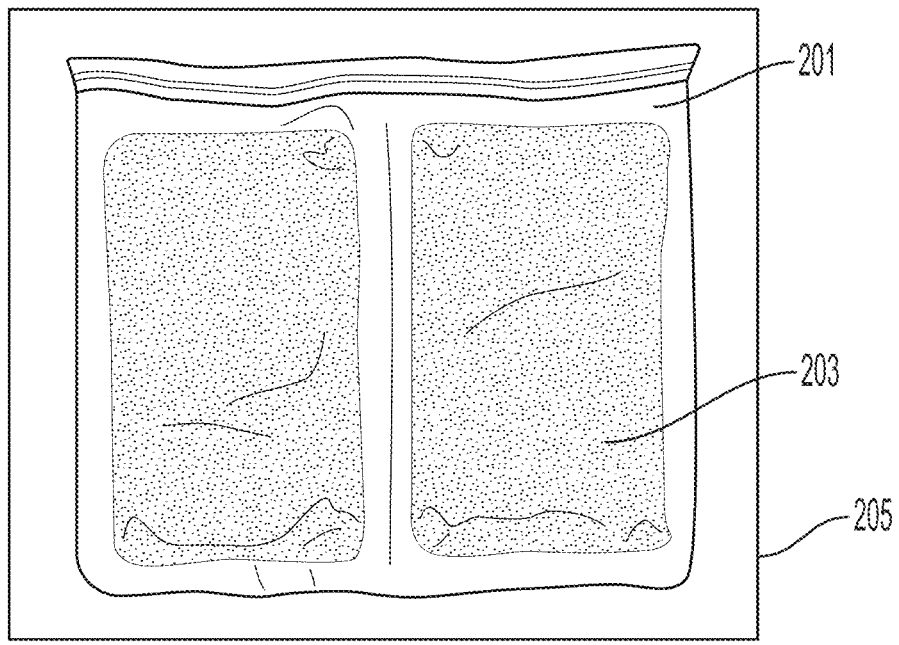
FIG. 2D illustrates a disposal container housing tandem pods of pharmaceutical mitigation component, in accordance with one embodiment.

FIG. 2D illustrates an alternative flexible pouch disposal container 201, shown housing tandem pharmacological agent activity mitigation component pods 203. The disposal container 201 and pharmacological agent activity mitigation pods 203 are placed in a flat mailer 205 meeting United States Postal Service requirements for an automation flat. The pouch disposal container 201 may be used with a flat mailer, such as shown and described with respect to FIGS. 5C and 5D. The flexible pouch disposal container 201 is water impermeable, may be foldable, and has a pocket for receiving the pharmacological agent activity mitigation component pods 203. The flexible pouch disposal container 201 may include a tear notch and a zipper type seal to seal the pouch. The disposal container 201 may be preloaded with the pharmacological agent activity mitigation component pods 203 or may be provided separately therefrom.

Figure 2E:
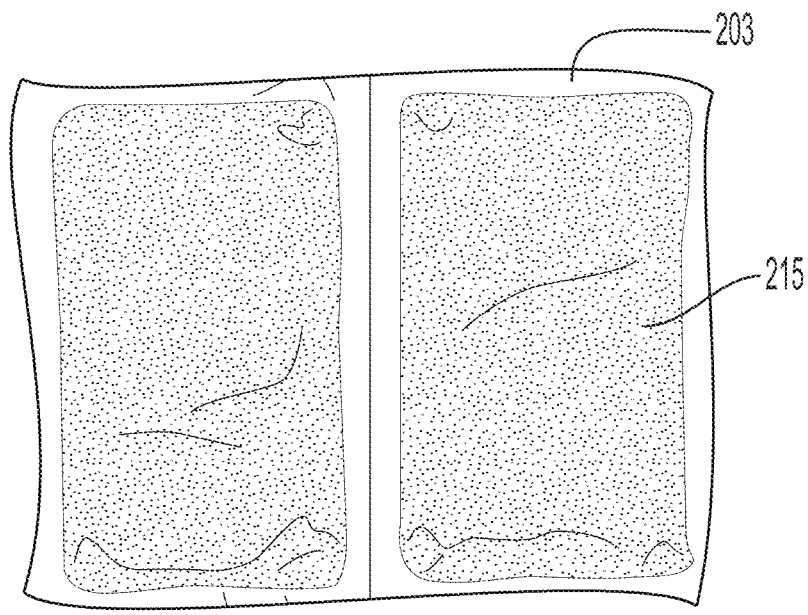
FIG. 2E illustrate the tandem pods of FIG. 2D.

FIG. 2E illustrates tandem pharmacological agent activity mitigation component pods 203, in accordance with one embodiment. The pharmacological agent activity mitigation component 215 may be, for example, activated carbon. Each pod may be formed of a water soluble film. In some embodiments, the pharmacological agent activity mitigation component pods 203 may have a web of film coupling them to one another. In one embodiment, each pod may be approximately 2.25" wide×4" long×0.4" thick. Using tandem pods, it is possible to mitigate any sagging or bulging of the pod due to the weight of the carbon, thereby maintaining a maximum thickness of approximately 0.75".

Pharmacological agent activity mitigation components, carriers for the same, and flat mailers are described more fully below.

Pill Vial Disposal Container and Sequestering Agent Mitigation Component

In one example, a disposal container comprising a pill vial and a pharmacological agent activity mitigation component comprising a sequestering agent are provided. The sequestering agent is a gelling agent comprising a polymer capable of forming a highly viscous mass when mixed with water. During use, the polymer is emptied from a packet into the pill vial along with a volume of water sufficient to immerse the pills.

FIGS. 3A to 3C illustrate aspects of a method for disposal of an unwanted pharmaceutical formulation using a pill vial disposal container and a gelling agent, in accordance with one embodiment. More specifically, FIGS. 3A to 3C illustrate the introduction of water is into a pill vial disposal container such that a pharmaceutical composition and active agent thereof combine with the pharmacological agent activity mitigation component. In FIG. 3A, a pill vial 300 having a removable cap 301 for sealing the pill vial 200 is provided. The pill vial may include the unwanted pharmaceutical formulation pills 302, such as when the pill vial is the dosage container for the pills 302 (the original container in which the pills were prescribed) or the pills 302 may be placed in the pill vial 300. Liquid is added to the interior of the disposal container to facilitate combining of the unwanted pharmaceutical formulation and the pharmacological agent activity mitigation component. For example, as shown in FIG. 3B, the removable cap is removed, and water 304 and the highly viscous mass-producing polymer 303 are added to the unwanted pharmaceutical formulation in the interior of the vial. FIG. 3C illustrates the vial 300 containing a highly viscous mass 305 containing the pills. Creation of such highly viscous mass 305 may be facilitated by gently shaking the vial. The vial is then resealed by replacing the removable cap 301 onto vial.

Bottle Disposal Container Pre-Loaded with Activated Carbon

Figure 4A:
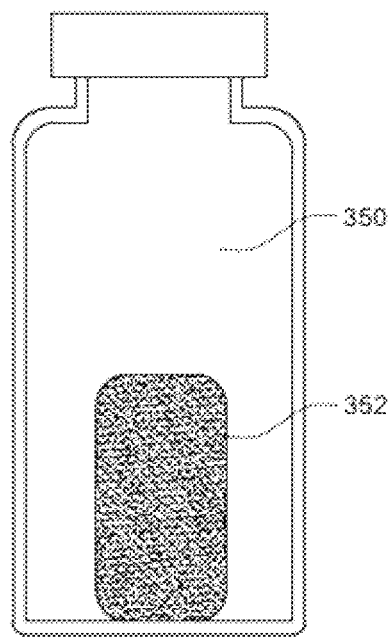
FIG. 4A illustrates a bottle disposal container pre-loaded with an activated carbon pod, in accordance with one embodiment.
Figure 4B:
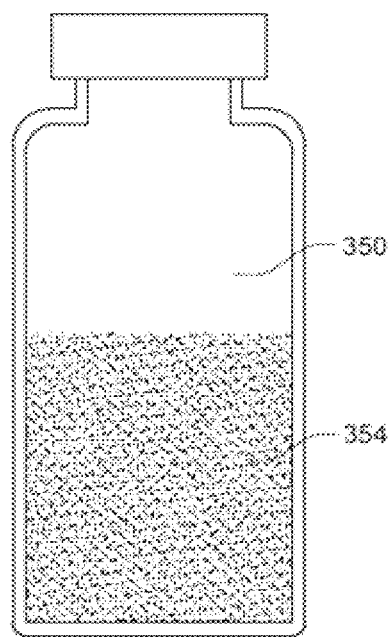
FIG. 4B illustrates a bottle disposal container pre-loaded with slurry 354, in accordance with one embodiment.
Figure 4C:
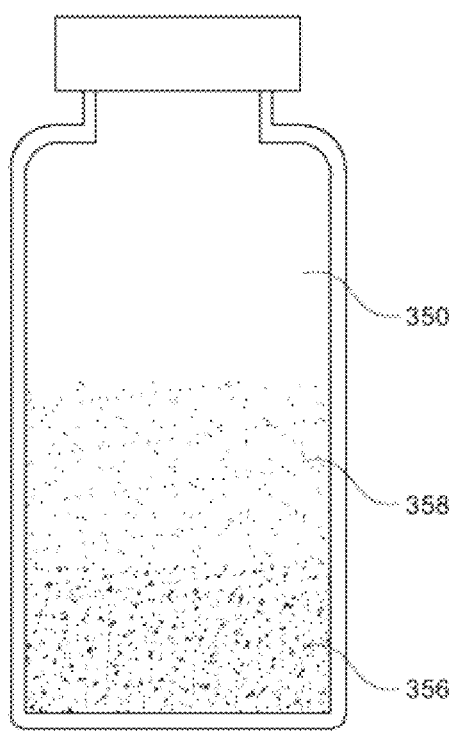
FIG. 4C illustrates a bottle disposal container pre-loaded with activated carbon and a liquid, in accordance with one embodiment.

FIGS. 4A, 4B, and 4C illustrate the aspects of a method for disposal of an unwanted pharmaceutical formulation using a pre-loaded bottle disposal container.

FIG. 4A illustrates a bottle disposal container 350 pre-loaded with an activated carbon pod 352, in accordance with one embodiment. In this embodiment, liquid may be added to the interior of the bottle disposal container 350 to form a slurry. This may be done before or after addition of the unwanted pharmaceutical formulation.

FIG. 4B illustrates a bottle disposal container 350 pre-loaded with an activated slurry 354, in accordance with one embodiment. The slurry 354 may comprise a pharmacological agent activity mitigation component suspended in a liquid such as water.

FIG. 4C illustrates a bottle disposal container 350 pre-loaded with activated carbon 356 and a liquid 358, in accordance with one embodiment. As shown, the activated carbon 356 may be provided in a free-form configuration. The activated carbon 356 and the liquid 358 may be agitated to form a slurry.

Delivery Packages and Mailers

Envelope Delivery Packages and Mailers

In one example, a delivery package comprising a pre-addressed and prepaid envelope dimensioned 7×11" and containing an absorbent sheet is provided. The delivery package is used by a consumer to mail the unwanted pharmaceutical agent (combined with a pharmacological agent activity mitigation component in a disposal container) to a remote location such as a disposal facility. The envelope includes a barcode allowing for the envelope and the contents within to be tracked by scanning the envelope. The disposal container and delivery package, and use thereof, are designed to make unwanted pharmaceutical formulation disposal easy for a subject or agent thereof, and specifically for a subject or agent thereof who does not work in the healthcare or pharmaceutical space.

Figure 5A:
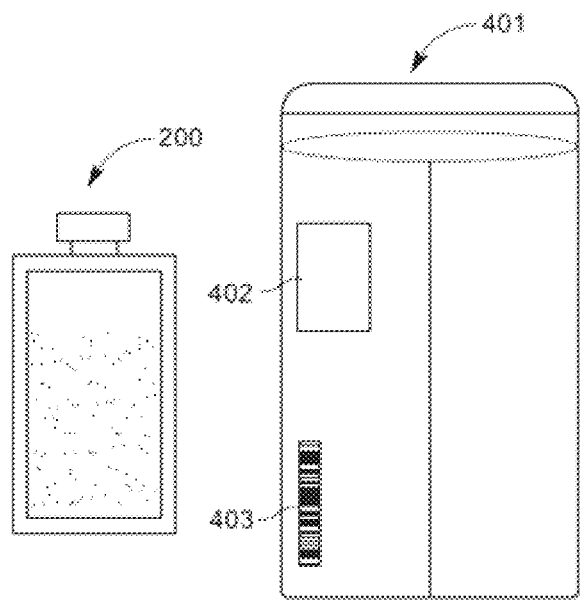
FIG. 5A illustrates a disposal container having an unwanted pharmaceutical formulation and a pharmaceutical mitigation component therein and a delivery package for receipt of the disposal container, in accordance with one embodiment.
Figure 5B:
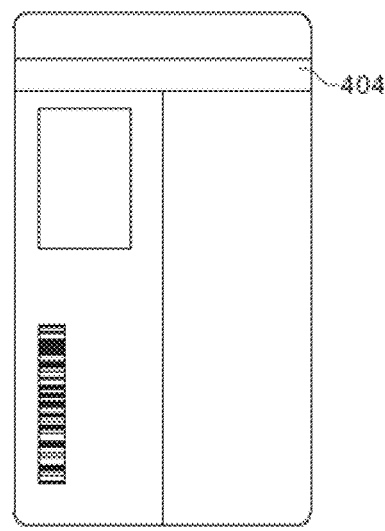
FIG. 5B illustrates a disposal container having an unwanted pharmaceutical formulation and a pharmaceutical mitigation component therein and a delivery package for receipt of the disposal container, in accordance with one embodiment.

FIGS. 5A and 5B illustrate aspects of a method for disposal of an unwanted pharmaceutical formulation, in accordance with one embodiment. The method may include combining an unwanted pharmaceutical formulation and a pharmacological agent activity mitigation component, such as activated carbon, in a disposal container comprising a water impermeable scalable pouch, such as those shown and described with respect to FIGS. 2A-2D. FIG. 5A illustrates a delivery package comprising an envelope 401 and a pouch disposal container 200 containing the unwanted pharmaceutical formulation, the pharmacological agent activity mitigation component, and water. The sizes of the pouch 200 and the envelope 401 may be coordinated such that the envelope 401 easily accommodates the pouch 200. For example, the pouch 200 may be have dimensions of 5×9" and the envelope may have dimensions of 7×100".

In FIG. 5A, the envelope 401, including an address and paid postage 402 and a scannable barcode 403, is opened. As shown in FIG. 4B, the water impermeable scalable pouch 200 is inserted into the envelope 401 alongside the absorbent sheet. The envelope is sealed by removing a release liner from an adhesive seal and pressing the adhesive components of the seal together. A tamper evident label 404 may be placed over the seal. The envelope is then given to a shipper for shipment to a remote location.

Figure 5C:
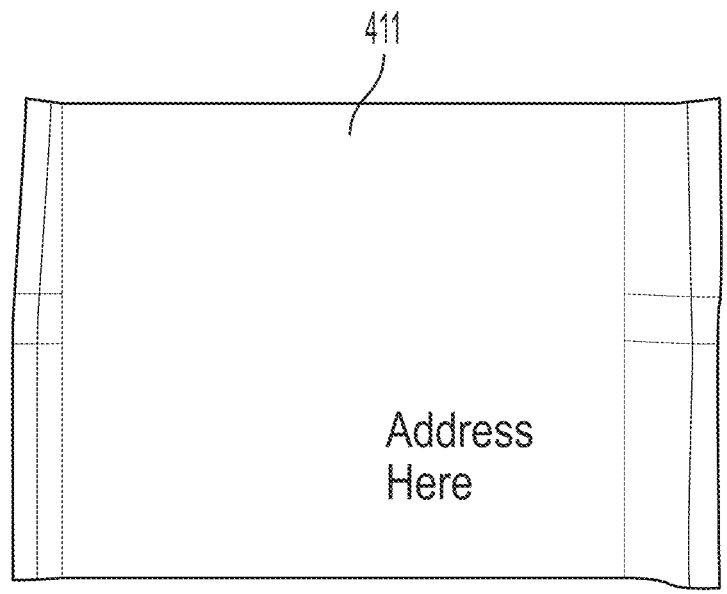
FIG. 5C illustrates a flat mailer, in accordance with one embodiment.
Figure 5D:
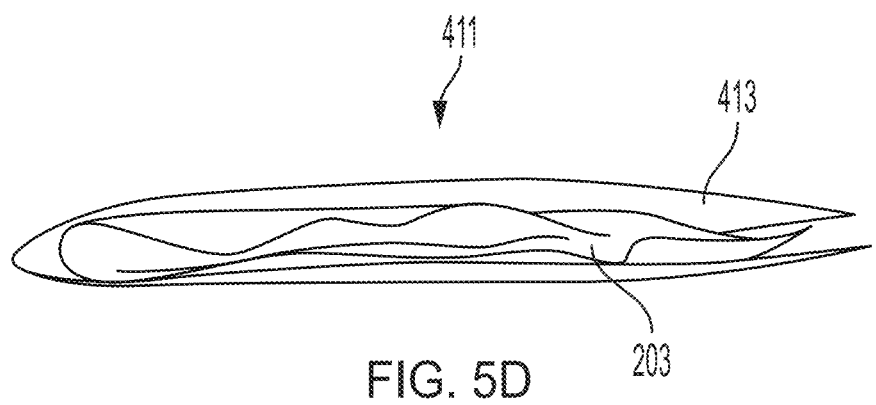
FIG. 5D illustrates the flat mailer of 5C, showing a disposal container therein.

FIGS. 5C and 5D illustrate a direct mail mailer 411. The direct mail mailer 411 is used to send an unwanted pharmaceutical formulation disposal kit to a user. In the embodiment shown, the direct mail mailer comprises a relatively flat mailer. FIG. 5C illustrates a top view. FIG. 5D illustrates an end view. The direct mail mailer 411, also referred to as a flat mailer, is suitable for processing as an automated mail flat. This means that the direct mail mailer meets United States Postal Service requirements for length, width, thickness, variability in thickness, and flex. The direct mail mailer has a thickness no more than 0.75 inches and a thickness variability no greater than 0.25 inches. The direct mail mailer must flex at least 1 inch at both midpoints. The mailer may be between 11½ and 15 inches long and between 5⅛ and 12 inches wide. The direct mail mailer may comprise a cardstock mailer. The cardstock mailer may be a folded piece of cardstock 413, a folded piece of cardstock with an overwrap, a cardstock envelope, or other suitable cardstock configuration.

In one embodiment, the direct mail mailer has a length of 11½ inches, a width of 5⅛ inches, and a thickness of 0.75 inch (when housing a disposal container and a pharmacological agent activity mitigation component). The flat mailer receives a pouch disposal container such as shown in FIG. 2D.

In use, the direct mail mailer 411 of FIGS. 5C and 5D is preloaded with a pharmacological agent activity mitigation component provided there in. In some embodiments, the pharmacological agent activity mitigation component may be preloaded in a disposal container such as a pouch. In one embodiment, the pharmacological agent activity mitigation component comprises activated carbon and is disposed in a carrier. More specifically the activated carbon is disposed in a water soluble or water permeable pod. In other embodiments, the pharmacological agent activity mitigation component may be a sequestering agent. In the embodiments of FIGS. 2D and 2E, the pharmacological agent activity mitigation components comprise activated carbon provided in tandem pods.

Figure 5E:
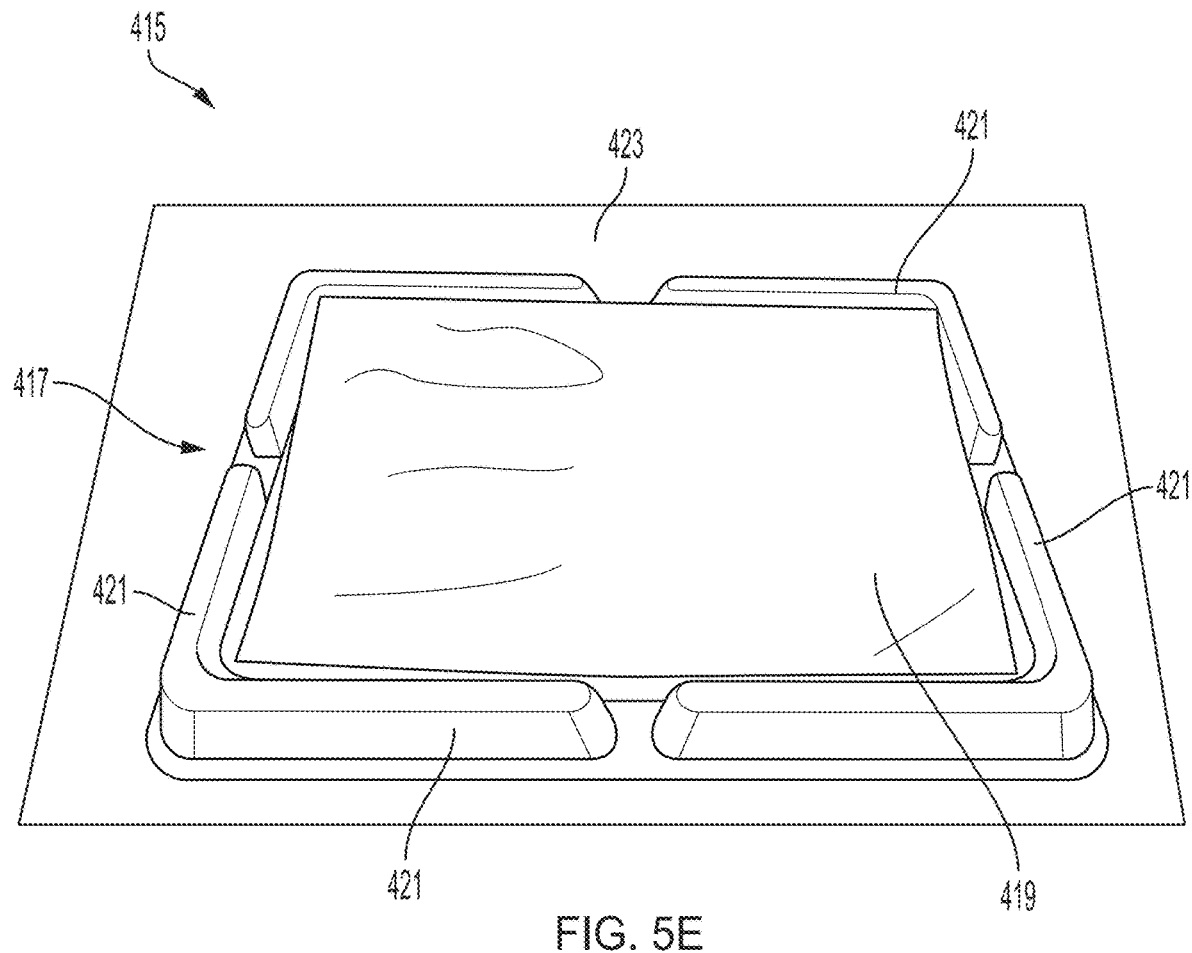
FIG. 5E illustrates a flat mailer, in accordance with another embodiment.

FIG. 2D illustrates a direct mail mailer 205 housing a disposal container 201 containing a pharmacological agent activity mitigation component 203. The pods may comprise generally flat, flexible active carbon pods. When a pouch disposal container having tandem pods therein is used, the pouch disposal container may be folded at a portion of the pouch generally center to the pods. A piece of cardstock may is folded over the pouch disposal container. The cardstock may have an address printed thereon. The cardstock may be sized to substantially cover the pouch disposal container, or the folded pouch disposal container, when folded thereabout. Overwrap may be placed around the address sheet to secure the pouch disposal container within the address sheet. In some embodiments, the direct mail FIG. 5E illustrates a direct mail mailer comprising a relatively flat mailer 415, in accordance with another embodiment. The flat mailer may be suitable for processing as an automated mail flat. The mailer includes a tray 417 having a receptacle 419 for receiving a pouch disposal container. The receptacle has edges 421 there about, including side edges, a top edge, and a bottom edge. Indents, or flexion points, are provided midway on each of the side edges, each of the top and bottom edges, or all of the edges. In some embodiments, the tray may be thermoformed. The tray 417 is placed within a mailer 421 such as a In use, the direct mail mailer of FIG. 5E may be preloaded with a pouch disposal container housing a pharmacological agent activity mitigation component. In the embodiment shown, the pharmacological agent activity mitigation component comprises active carbon and is provided in a pod carrier. The disposal container may have a single pod therein, may have tandem pods such as shown in FIGS. 2C and 2D, or may have more than two pods therein. The pods may comprise generally flat, flexible activated carbon pods. The pouch disposal container is placed in the receptacle of the tray. In some embodiments, such as with use of tandem pods, the disposal pouch may be folded before placement in the receptacle of the mailer tray. The tray is placed in a mailer. The mailer may, for example, comprise a piece of cardstock or a cardstock envelope. The cardstock may be printed with an address. The cardstock, whether an envelope for receiving the tray or a piece of cardstock for folding over the tray, may be sized to substantially cover the pouch disposal container, or the folded pouch disposal container, as placed in the receptacle. An overwrap may be placed around the tray delivery package and address sheet.

A tray delivery package such as shown in FIG. 5E is useful for packaging any non-rigid article and providing some rigidity to the package while providing flexibility and the ability to be process as an automated mail flat.

Box Delivery Package

In one example, a delivery package comprising a pre-addressed and prepaid box and containing an absorbent sheet is provided. The box includes a QR code allowing for the box and the contents within to be tracked by scanning the box. The disposal container and delivery package, and use thereof, are designed to make unwanted pharmaceutical formulation disposal easy for a subject or agent thereof, and specifically for a subject or agent thereof who does not work in the healthcare or pharmaceutical space.

Figure 6A:
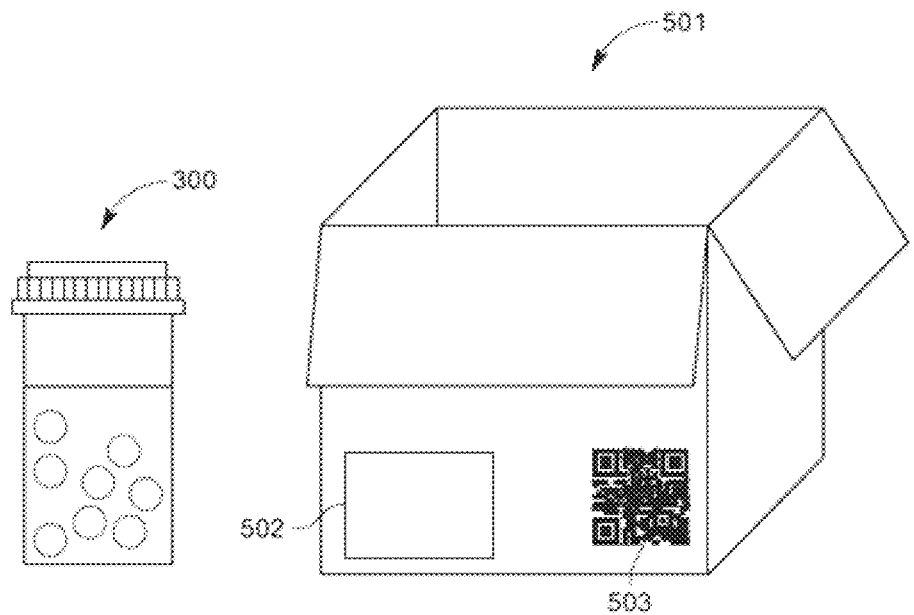
FIG. 6A illustrates a disposal container having an unwanted pharmaceutical formulation and a pharmaceutical mitigation component therein and a delivery package for receipt of the disposal container, in accordance with one embodiment.
Figure 6B:
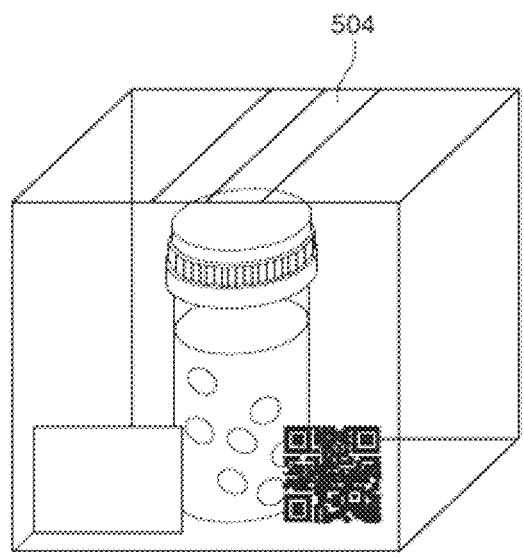
FIG. 6B illustrates a disposal container having an unwanted pharmaceutical formulation and a pharmaceutical mitigation component therein and a delivery package for receipt of the disposal container, in accordance with one embodiment.

FIGS. 6A to 6B illustrate the aspects of a method for disposal of an unwanted pharmaceutical formulation, in accordance with one embodiment. The method may include combining an unwanted pharmaceutical formulation and a pharmacological agent activity mitigation component comprising a sequestering or gelling agent in a disposal container comprising a pill vial, as shown and described with respect to FIGS. 3A-3C. FIG. 6A illustrates a delivery package comprising a box 501 and a pill vial disposal container 300 containing a mixture of an unwanted pharmaceutical formulation, highly viscous mass-producing polymer, and water. The sizes of the pill vial 300 and the box 501 may be coordinated such that the box 501 easily accommodates the pill vial 300. The box 501 may be sized to snugly hold the pill vial 300 such that the pill vial 300 is not loose and subject to jostling during transport.

In FIG. 6A, the box 501 including an address and postage 502 and a scannable QR code 503 is opened. As shown in FIG. 6B, the pill vial 300 is inserted into the box 501, optionally with an absorbent sheet. The box 501 is sealed by removing a release liner from an adhesive seal and pressing the adhesive components of the seal against the box. A tamper evident label 504 may be placed over the seal. The envelope is then given to a shipper for shipment to a remote location.

Detail will now be given to certain aspects of the system and method for disposing of unwanted pharmaceutical formulations disclosed herein.

Disposal Container

Systems and methods for disposal of an unwanted pharmaceutical formulation disclosed herein include combining the unwanted pharmaceutical formulation with a pharmacological agent activity mitigation component (also referred to as a mitigation component) in a disposal container. In some embodiments, the disposal container may be a dosage container (or pharmaceutical composition container) in which an unwanted pharmaceutical formulation was packaged for receipt by a subject. In other embodiments, the disposal container may be a separate container from the dosage container.

Figure 7A:
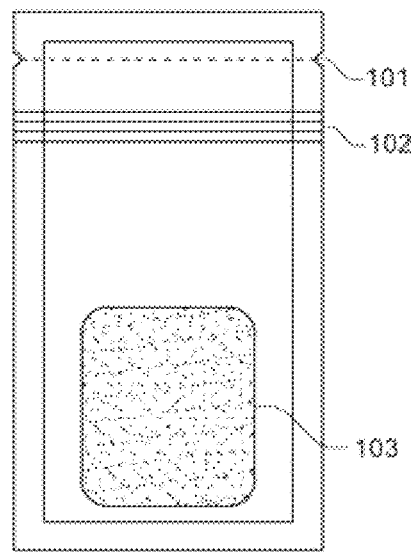
FIG. 7A illustrates a disposal container housing a pharmaceutical mitigation component, in accordance with one embodiment.
Figure 7B:
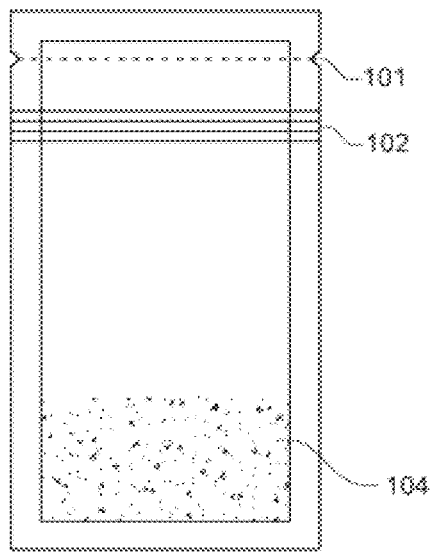
FIG. 7B illustrates a disposal container housing a pharmaceutical mitigation component, in accordance with one embodiment.
Figure 7C:
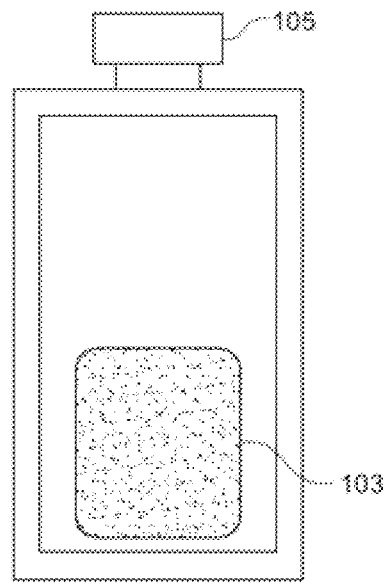
FIG. 7C illustrates a disposal container housing a pharmaceutical mitigation component, in accordance with one embodiment.
Figure 7D:
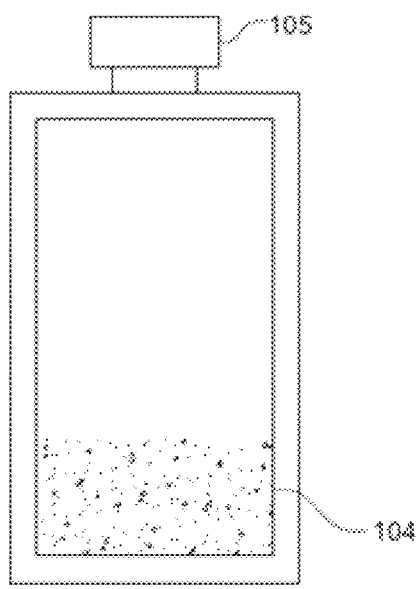
FIG. 7D illustrates a disposal container housing a pharmaceutical mitigation component, in accordance with one embodiment.

FIGS. 7A to 7D illustrate example disposal containers having a pharmaceutical mitigation component in accordance with embodiments of the invention. In FIG. 7A, a water impermeable sealable pouch is provided containing an activated carbon pod 103 and having a tear notch 101 to open the pouch and a zipper type seal 102 to seal the pouch. In FIG. 7B, a water impermeable sealable pouch is provided containing free-flowing activated carbon 104 and having a tear notch 101 to open the pouch and a zipper type seal 102 to seal the pouch. In FIG. 7C, a water impermeable sealable pouch is provided containing activated carbon pod 103 and having a removable twist off cap 105 sealing the pouch. In FIG. 7D, a water impermeable sealable pouch is provided containing free-flowing activated carbon 104 and having a removable twist off cap 105 sealing the pouch.

In general, the disposal container has a liquid impermeable body having walls defining an interior compartment and has a sealable opening. The interior compartment includes an interior surface and a volume.

The disposal container may have any suitable configuration and is generally dimensioned to accommodate the unwanted pharmaceutical formulation and a pharmacological agent activity mitigation component. Suitable configurations for the disposal container include, for example, pouches, bottles, bags, etc. Walls of the disposal container may be rigid, semi-rigid, flexible, or semi-flexible.

In some embodiments, the volume of interior compartment of the disposal container may be such that the unwanted pharmaceutical formulation and the pharmacological agent activity mitigation component can be positioned in the interior compartment of the disposal container. In some embodiments, when the unwanted pharmaceutical formulation and the pharmacological agent activity mitigation component are placed in the interior compartment, there may be additional space to accommodate a volume of liquid, e.g., from 50 to 500 ml of liquid or more. Accordingly, the volume of the disposal container may range in some instances from 50 to 500 ml, such as 100 to 400 ml, or 200 to 375 ml.

In some embodiments, the disposal container may be dimensioned to accommodate a blister pack containing an unwanted pharmaceutical formulation, a pharmacological agent activity mitigation component, and a volume of liquid.

In embodiments wherein the disposal container has a pouch or bag configuration, the dimensions of such may vary, ranging in some instances from 2×3 inches to 8×10 inches, such as from 6×6 inches or 6×10. The thickness of the walls of the disposal container may also vary. For example, in some embodiments, the walls may have a thickness ranging from 0.1 to 2.0 mm, such as 0.1 to 1.0 mm.

The disposal container may be fabricated from any suitable material that is impermeable to liquid, e.g., an aqueous liquid. In some embodiment, the disposal container may comprise a polymeric material such as polyvinylchloride, polyethylene, polyvinylacetate, etc. The disposal container may be transparent, semi-transparent, translucent, opaque, or semi-opaque.

The disposal container may have a sealable opening for sealing the disposal container after receipt of the unwanted pharmaceutical formulation and the pharmacological agent activity mitigation component. Such sealable opening may result in a permanent or locked seal or may be re-openable. Accordingly, the container may include a sealable closure device which, when opened, provides access to deposit the unwanted pharmaceutical formulation into the container. The closure device may comprise an adhesive seal or plastic container reseal device such as a zipper type seal. In some instances, the closure device comprises a cap.

In some embodiments, the disposal container may include a vent. The vent may have any configuration that allows for passage of gas generated during use of the device from the inside to the outside of the container. Such vent may comprise, for example, a one way gaseous vent that allows for passage of gas from the interior compartment of the disposal container to outside of the disposal container but not vice versa, such as vents typically found in coffee bags, e.g., as described in U.S. Pat. Nos. 4,000,846 and 4,122,993. Vents may be included in any suitable part of the container, such as side walls, top walls, caps, etc.

Various containers that may be used as disposal containers for use with systems and methods for disposing of unwanted pharmaceutical formulations include, but are not limited to, those described in U.S. Pat. Nos. 8,979,724 and 11,389,844 as well as U.S. Pending application Publication Ser. No. 17/840,889; the disclosures of which are herein incorporated by reference.

Pharmacological Agent Activity Mitigation Component

The disclosed system and method for disposing of unwanted pharmaceutical formulations include combining the unwanted pharmaceutical formulation with a pharmacological agent activity mitigation agent in a disposal container.

Any suitable pharmacological agent activity mitigation component may be employed. In some instances, pharmacological agent activity mitigation components including binding agents, adsorption agents, and/or gelling agents. In general, the pharmacological agent activity mitigation component is suitable for rendering the API no longer available physiologically, to prevent them from getting into waterways when disposed of in landfills, and to prevent later extraction of the API.

It is to be appreciated that some pharmaceutical compositions may include organics other than the API, such as buffers and fillers. If such organics are provided, it may be advantageous to provide an amount of pharmacological agent activity mitigation component over what may be used for only the API.

"Binding agent" refers to a substance or combination of substances that immobilize or otherwise deactivate an API on contact (e.g., the binding agent may serve to tie up or bind the API from the pharmaceutical formulation so that the API is no longer accessible). Suitable binding agents include agents that immobilize the medication and preclude future separation by normally available means. Example binding agents include activated carbon, gums (such as carrageenan, alginate, and polyvinyl alcohol, superabsorbents and clays. In some embodiments, the pharmacological agent activity mitigation component may comprise a binding agent with or without presence of other agents.

In some embodiments, the binding agent may comprise or include adsorption substances that adsorb the active agent or chemisorb substances that chemically bind the active agent (i.e., an adsorbing agent). Adsorbing agents are agents that provide a surface to which the API may adhere in a stable fashion such that it is no longer available. Any suitable adsorbing agent may be used. In some embodiments, the adsorbing agent is activated carbon.

Activated carbon is suitable for the adsorption or chemisorption of the API of unwanted pharmaceutical formulations and may be used as a binding agent. The term "activated carbon" refers to carbon that has been treated to increase its adsorptive power. This may comprise carbon that has been processed to provide for a high surface area, such as more than 500 m2, more than 1,000 m2, more than 1,500 m2, more than 2,000 m2, more 2,500 m2, or more than 3,000 m2. Activated carbon may be obtained from any suitable source, including but not limited to: Norit Corporation (fka Cabot Corporation), Calgon Carbon, Jacobi Carbon, and the like. When employed, the amount of activated carbon may vary, ranging in some instances from 2 to 15 grams carbon for every gram of API and/or organics to be adsorbed, such as 3 to 10 grams carbon for every gram of API and/or organics to be adsorbed.

When present as the binding agent, the activated carbon may be in powder form, granular form, pelletized form, or other form. Powdered activated carbon is a carbon composition having an average particle size of 0.25 mm or less, e.g., from 0.15 to 0.25 mm. Granular or pelletized activated carbon comprises particles or pellets having an average size of 0.25 mm or higher, such as from 0.25 to 5.0 mm.

In some embodiments, the activated carbon may not be free-flowing in the disposal container. For example, the activated carbon may be stably associated with another component of the disposal container such as a wall of the disposal container or a support structure in the disposal container. Alternatively, the activated carbon may be provided in a carrier for placement in the interior of the disposal container. The carrier may comprise, for example, a water soluble pod or a water permeable pod. In other embodiments, the activated carbon may be free-flowing in the container.

For use in a water-soluble pod, an amount of activated carbon may be encased in a water-soluble material configured for dissolution upon contact with a liquid. For example, a pod may be provided comprising a water-soluble polymeric film. For use in a water permeable pod, an amount of activated carbon may be encased in a water permeable material.

The amount of activated carbon encased in a carrier may vary, ranging, for example, from 2 to 200 grams, such as 5 to 100 grams. The carrier may have any convenient shape, wherein the shape may be chosen to fit within the disposal container. In some instances, the carrier may have a longest dimension, e.g., length, width, height, ranging from 1 to 50 cm, such as 2 to 30 cm, including 5 to 25 cm.

Other adsorbing agents that may be employed instead of, or in addition to, activated carbon, include but are not limited to clays, including natural and synthetic clays, such as but not limited to: kaolin, talc, smectite, vermiculite, mica, chlorite, sepeolite and sodium magnesium silicate, etc.

Other examples of binding agents that may be used instead of, or in addition to, activated carbon include but are not limited to zeolites, silica gel, and aluminum oxide.

In addition or alternatively to adsorbing agents, the pharmacological agent activity mitigation component may comprise a sequestering agent, e.g., an agent which serves to isolate an API in some manner so that it is at least substantially, if not completely, unavailable. In some instances, the sequestering agent may be a gelling or massing agent that forms a highly viscous mass upon mixing with a solvent. Where a highly viscous mass is produced, the viscosity may be, for example, 25,000 cps or greater, 50,000 cps or greater, 100,000 cps or greater, 250,000 cps or greater, ranging in some instances from 100,000 to 100,000,000 cps.

Suitable sequestering agents of interest include polymeric materials. Polymers, copolymers or derivatives thereof suitable for use as sequestering agents include, but are not limited to: polysaccharides, e.g., gums, including synthetic and natural gums, such as xanthum, guar and carrageenan gums, celluloses, cellulose ethers, cellulose esters, cellulose amides, such as methylcellulose, carboxymethylcellulose sodium, dextrin, ethylcellulose, hydroxyethyl cellulose, hydroxypropyl methylcellulose, maltodextrin, starches and gelatins, acrylic acid and polyacrylates, including acrylate copolymers (such as copolymers of maleic/acrylic acids), polymethacrylates, sodium polyacrylates, Carbomers, etc., as well as polyvinyl acetates, polycarboxylic acids and salts, polyaminoacids or peptides, polyamides, polyacrylamide, polyvinyl alcohols, polyvinyl alcohol copolymers polyvinyl pyrrolidone, polyalkylene oxides, etc. In such instances, the polymeric sequestering agent can have any weight average molecular weight, such as from 1000 to 1,000,000, e.g., from 10,000 to 300,000, including from 20,000 to 150,000. Mixtures of polymers can also be used. In general, the formed mass is unlikely to leak if there is a breach in the disposal container.

In some embodiments, a sequestering agent, such as a solidifier or superabsorbent, may be used in addition to an adsorption agent, such as activated carbon. For example, the unwanted pharmaceutical formulation may be mixed with activated carbon and water to form a slurry and a solidifier may be added to the slurry to create a highly viscous mass.

In addition to or instead of the above adsorbing and sequestering agents, the pharmacological agent activity mitigation component may include other substances which in some way render the active agent (i.e., API) of the pharmaceutical composition unusable. Accordingly, the pharmacological agent activity mitigation component may contain one or more distressing agents such as a taste deterrent, an antagonist, an irritant compound, an oxidizing compound, or an anti-abuse distressing agent. Such compounds may be used singly or in combination. Examples of taste deterrents include denatonium benzoate, sucrose octaacetate and capsaicin. Examples of anti-abuse distressing agents include bitter taste agents, such as dehydrocholic acid. Examples of antagonists are those which exhibit antagonist activity relative to the active agent of the pharmaceutical composition, e.g., naloxone or naltrexone for opioids. An example of an irritant compound is ipecac. Examples of oxidizing agents include perborates, percarbonates, peroxides, and hypochlorites. When used in combination with other agents, such compounds may be complexed with the other agents, as desired.

In embodiments using a sequestering agent without an adsorbing agent, the unwanted pharmaceutical composition may be suspended in a highly viscous mass without neutralization of the API of the unwanted pharmaceutical composition. In such embodiments, distressing agents may be added to deter extraction and use of the unwanted pharmaceutical composition.

In some instances, in addition to the pharmacological agent activity mitigation component one or more excipients which impart additional functionality may be employed. For example, buffering agents may be included in the disposal container to provide for pH adjustment to a pH which provides for optimal inactivation of the API of the unwanted pharmaceutical formulation, for example via adsorption of the API. Any suitable buffering agent that provides for the desired pH during use may be employed. Another type of excipient of interest is salt, such as a divalent metal cation salt, e.g., where the divalent metal cation is selected from the group consisting of $Ca^{2+}$ and $Mg^{2+}$. An example ion is the use of calcium or magnesium salts that can be used to minimize the water absorption and expansion of Lidoderm hydrogel patches.

Pharmacological Agent Activity Mitigation Component Delivery

Aspects of methods for disposing of unwanted pharmaceutical formulations disclosed herein include combining an unwanted pharmaceutical formulation and a pharmacological agent activity mitigation component (also referred to as a mitigation component) in a disposal container. The phrase "pharmaceutical agent activity mitigation component" refers to a composition of matter that, when contacted with a pharmaceutical composition (e.g., by mixing, etc.) reduces the effective activity of the API present in the pharmaceutical composition. The mechanism of reduction may vary, and may include one or more of destruction, deactivation, sequestration, combination with irritant, etc., depending on the nature of the pharmacological agent activity mitigation component and/or the nature of the unwanted pharmaceutical formulation.

In some embodiments, the pharmacological agent activity mitigation component may comprise an adsorption agent or a binding agent that renders the API to longer available physiologically and in order to prevent them from getting into waterways when disposed of in landfills. Example pharmacological agent activity mitigation components include activated carbon. In some embodiments, liquid may be added to the disposal container after provision of the unwanted pharmaceutical component and the pharmacological agent activity mitigation component in order to facilitate mixing thereof.

In some embodiments, the pharmacological agent activity mitigation component may be provided predisposed in the interior of the disposal container. In other embodiments, an amount of pharmacological agent activity mitigation component may be provided for a user to place in the disposal container.

The amount of the pharmacological agent activity mitigation component in the disposal container, or provided for placement in the disposal container may vary, and may be more than theoretically required to substantially inactivate the amount of active agent in the pharmaceutical composition to be disposed of in the disposal container. While the exact amount may vary, in some instances the weight ratio of pharmacological agent activity mitigation component (e.g., activated carbon) to active agent is 2 (i.e., 2/1) or higher, such as 3 or higher, including 4 or higher, such as 5 or higher.

The pharmacological agent activity mitigation component may be provided in the disposal container in a variety of configurations. For example, the pharmacological agent activity mitigation component may be free-form (loose in the disposal container), may be in a carrier (such as pod), or may be stably associated with a component of the disposal container. In some embodiments, such as provision in a carrier or stably associated with a component of the disposal container, the pharmacological activity agent is immobilized prior to use disposal of an unwanted pharmaceutical formulation in the disposal container. In some embodiments, the pharmacological agent activity mitigation component may be provided in a separate package prior to use and may be removed for the package for combination with the unwanted pharmaceutical formulation.

In some embodiments, the pharmacological agent activity mitigation component may be present in a carrier such as a pod. The pod may be water soluble or may be water permeable. The carrier holds the contents of the enclosure inside of the enclosure, at least prior to contact with liquid.

In some embodiments, the carrier may comprise a pod fabricated from a water soluble material that substantially dissolves upon contact with liquid and releases the pharmacological agent activity mitigation component. In some embodiments, the pod may be coupled with the disposal container.

For pod carriers, the water-soluble film may have any suitable thickness such that, upon contact by liquid in the disposal container, the film substantially dissolves to release the pharmacological agent activity mitigation component.

Different film material and/or films of different thickness may be employed in making pod carriers for use with systems and methods of unwanted pharmaceutical formulation disposal as disclosed herein. In some embodiments, the film used for a pod may exhibit good dissolution in cold water, such as unheated water. In some instances, the employed films exhibit good dissolution at temperatures 24° C. or lower, such as 10° C. or lower. By good dissolution it is meant that the film exhibits water-solubility of 50% or more, such as 75% or more, including 95% or more, e.g., as determined using the protocol described in U.S. Pat. No. 9,988,595; the disclosure of which is herein incorporated by reference. In some embodiments, the film may have a thickness of from 20 to 200 microns, such as 35 to 150 microns, 50 to 125 microns, or 75 to 100 microns.

Any suitable film material may be employed, where in some instances the material is a polymeric material. Polymeric materials (including copolymer materials, terpolymer materials, or derivatives thereof) suitable for use as film material may include, for example, polyvinyl alcohols (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. In some instances, the polymer(s) may be polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and including polyvinyl alcohols, polyvinyl alcohol copolymers and hydroxypropyl methyl cellulose (HPMC), and combinations thereof. In some instances, the level of polymer in the film material is 60% or more.

Mixtures of polymers can also be used as the film material. Suitable mixtures include one polymer with a higher water-solubility and another polymer with lower water-solubility, and/or one polymer with a higher mechanical strength and another polymer with a lower mechanical strength. Also suitable herein are polymer blend compositions, for example comprising hydrolytically degradable and water-soluble polymer blends such as polylactide and polyvinyl alcohol comprising, for example, about 1-35% by weight polylactide and about 65% to 99% by weight polyvinyl alcohol. The polymer may be a polyvinyl alcohol which may be from about 60% to about 99% hydrolyzed to improve the dissolution characteristics of the material.

Suitable films for use in pod carriers include those supplied by Monosol (Merrillville, Ind., USA) under the trade references M7030, M8630, M8900, M8779, M8310, M9467, and PVA films of corresponding solubility and deformability characteristics. Other suitable films may include called Solublon® PT, Solublon® GA, Solublon® KC or Solublon® KL from the Aicello Chemical Europe GmbH, the films VF-HP by Kuraray, or the films by Nippon Gohsei, such as Hi Selon. Suitable films also include those supplied by Monosol for use in the following Procter and Gamble products: TIDE PODS, CASCADE ACTION PACS, CASCADE PLATINUM, CASCADE COMPLETE, ARIEL 3 IN 1 PODS, TIDE BOOST ORIGINAL DUO PACs, TIDE BOOST FEBREZE SPORT DUO PACS, TIDE BOOST VIVID WHITE BRIGHT PACS, DASH, FAIRY PLATINUM.

In some instances, the water-soluble films are those derived from a resin that comprises a blend of polymers, such as wherein at least one polymer in the blend is polyvinyl alcohol. In some instances, the water-soluble film resin comprises a blend of PVA polymers. For example, the PVA resin can include at least two PVA polymers, wherein the first PVA polymer has a viscosity less than the second PVA polymer. A first PVA polymer can have a viscosity of at least 8 centipoise (cP), 10 cP, 12 cP, or 13 cP and at most 40 cP, 20 cP, 15 cP, or 13 cP, for example in a range of about 8 cP to about 40 cP, or 10 cP to about 20 cP, or about 10 cP to about 15 cP, or about 12 cP to about 14 cP, or 13 cP. Furthermore, a second PVA polymer can have a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP. All viscosities specified herein in cP should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution.

The individual PVA polymers can have any suitable degree of hydrolysis, as long as the degree of hydrolysis of the PVA resin is within the ranges described herein. Optionally, the PVA resin can, in addition or in the alternative, include a first PVA polymer that has a Mw in a range of about 50,000 to about 300,000 Daltons, or about 60,000 to about 150,000 Daltons; and a second PVA polymer that has a Mw in a range of about 60,000 to about 300,000 Daltons, or about 80,000 to about 250,000 Daltons. Of the total PVA resin content in the film described herein, the PVA resin can comprise about 30 to about 85 wt % of the first PVA polymer, or about 45 to about 55 wt % of the first PVA polymer. For example, the PVA resin can contain about 50 w. % of each PVA polymer, wherein the viscosity of the first PVA polymer is about 13 cP and the viscosity of the second PVA polymer is about 23 cP. Further details regarding films that may be employed in embodiments of the invention may be found in U.S. Pat. No. 9,988,595; the disclosure of which is herein incorporated by reference.

In some embodiments, the carrier may comprise a pod fabricated from a water permeable material which maintains the pharmacological agent activity mitigation component inside of the carrier after the carrier has been contacted with liquid. Any suitable material may be employed for the carrier, including materials commonly employed for tea bags, e.g., cellulose materials, etc.

In some embodiments, the pharmacological agent activity mitigation component may be stably associated with a component of the disposal container such as a wall of the disposal container or a support present in the disposal container. For example, the pharmacological agent activity mitigation component may be adhered to an inner surface of the disposal container such as by provision as a layer on the inner surface of the disposal container. Where desired, a liquid permeable cover or liner may be positioned over the pharmacological agent activity mitigation component. In some embodiments, a support (such as a flexible, semi-flexible, or rigid, permeable or impermeable, solid structure) may be provided inside of the disposal container wherein the pharmacological agent activity mitigation component is stably associated with one or more surfaces of the support. The support may be attached to the disposal container or may be separate from and unattached to the disposal container.

Packaging

Aspects of methods for disposing of unwanted pharmaceutical formulations disclosed herein include combining an unwanted pharmaceutical formulation and a pharmacological agent activity mitigation component (also referred to as a mitigation component) in a disposal container and packaging the disposal container in a delivery package for sending the disposal container to a remote location for disposal of the unwanted pharmaceutical formulation. The combining and packaging steps can be performed by a subject prescribed the pharmaceutical formulation or an agent thereof.

The delivery package includes a base package, an absorption component, and, optionally, a preaddressed and/or prepaid shipping label and/or tracking indicia. In some embodiments, the delivery package may further include a liquid impermeable component. When a disposal container is packaged in the delivery package, there may be three layers of protection from inadvertent leakage of the content of the disposal container. First, the disposal container itself is substantially leak proof. Second, an absorption component may be provided within the delivery package to absorb any contents that are accidentally leaked from the disposal container. Third, the base package may be substantially liquid impermeable.

The base package may vary to be suitable for the disposal container being packaged. Example base delivery packages include envelopes, boxes, and shipping cylinders. The base package may be substantially liquid impermeable and may be puncture resistant.

An absorbent component may be provided to absorb any liquid that leaks from the disposal container (such as in a case where the disposal container is compromised) and to substantially prevent liquid that escapes the disposal container from exiting the interior of the delivery package. More specifically, an absorbent component may be provided such that liquid will not leak out of the delivery package should there be a breach in the disposal container. In one embodiment, the absorbent component is an absorbent sheet containing superabsorbents. In another embodiment, the absorbent component is a water soluble pod containing an absorbent or superabsorbent.

"Absorbent" refers to the absorbent component's ability to soak up liquid. More specifically, the absorbent component may comprise a material that is able to take a liquid in through a surface of the material and to retain the liquid therein such that it does not exit the delivery package. The absorbent component may have a high rate or speed of absorption such that liquid escaping or spilling from the disposal container is absorbed before reaching any seals that may be compromised. The absorbent component may further have a high absorbent capacity. "Absorbent capacity" refers to the mass of a liquid the absorbent component can absorb or retain relative to the mass of the material. For instance, the absorbent component may have an absorbent capacity of 5 times its weight or more, such as 10 times its weight or more, 20 times its weight or more, or 50 times its weight or more.

In some embodiments, the absorbent component comprises a superabsorbent material. "Superabsorbent" refers to a material capable of absorbing an extremely large amount of liquid relative to its own mass (i.e., have an extremely high absorbent capacity). An absorbent component comprising a superabsorbent material may have an absorbent capacity of 100 times its weight or more, several hundred times its weight or more, or 1000 times its weight or more.

In some embodiments, the amount of the absorbent material included with the delivery package may be sufficient to absorb and retain all liquid present in the disposal container. For example, the amount of the absorbent material included in the absorbent component may be sufficient to absorb and retain 10 ml of liquid or more, such as 50 ml of liquid or more, 100 ml of liquid or more, 200 ml of liquid or more, or 500 ml of liquid or more.

In some embodiments, the absorbent component may be incorporated into the delivery package. For example, the absorbent component may be stably associated with an inner wall of the delivery package. In some embodiments, the absorbent component may be stably associated with all the inner walls of the delivery package such that the disposal container is fully enclosed by the absorbent component after the disposal container has been inserted into the delivery package and the delivery package has been sealed.

In some embodiments, the absorbent component may be configured as a pouch or sleeve inside of the delivery package. In such embodiments, the absorbent pouch or sleeve may be configured to hold the disposal container. The absorbent pouch or sleeve may be stably associated with an inner wall of the delivery package. Alternatively, the absorbent component pouch or sleeve may be provided separate from the delivery package such that the disposal container may be inserted into the absorbent material pouch or sleeve and the absorbent material pouch or sleeve thereafter positioned inside of the delivery package.

In other embodiments, the absorbent component may comprise a sheet of absorbent material that may be placed in the delivery package. In yet other embodiments, the absorbent component may be free-flowing inside of the delivery package.

Examples of suitable absorbent materials include, but are not limited to, fiber-based materials such as e.g., tissue paper, cotton, cellulose, fluff pulp, and the like. Other examples of suitable absorbent materials include but are not limited to superabsorbent polymers such as e.g., sodium polyacrylate, polyacrylamide copolymer, ethylene maleic anhydride copolymer, cross-linked carboxymethylcellulose, polyvinyl alcohol copolymers, cross-linked polyethylene oxide, starch grafted copolymer of polyacrylonitrile, superabsorbent polymers such described at https://safetec.com/product/zorb-sheets-blood-body-fluid-absorbents/, etc. Further, suitable absorbent materials may include any of the sequestering agents previously described as forming a mass upon mixing with a solvent.

In some embodiments, the absorbent component comprises a sheet of porous material impregnated with the absorbent. "Porous" refers to material having pores or voids. The absorbent may be loaded into such pores or void. In some embodiments, the absorbent component may comprise an absorbent material either partially or fully encased by a water-soluble mater. In some embodiments, the water-soluble material may be configured as a sheet or film. Examples of water-soluble materials include, but are not limited to, polymeric materials (including copolymer materials, terpolymer materials, or derivatives thereof) such as e.g., polyethylene (PE), low-density polyethylene (LDPE), Linear low-density polyethylene (LLDPE), high density polyethylene (HDPE), polyvinyl alcohols (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. Further, suitable water-soluble materials may include any of the materials previously described as suitable for forming the water-soluble polymeric film for forming a delivery pod.

In some embodiments, the delivery package may include a liquid impermeable component. Such liquid impermeable component may be configured as a layer stably associated with wall of the delivery package, such as along interior walls of the delivery package. For example, the liquid impermeable layer may be co-fabricated with the base package or may be adhered to walls of the base package using an adhesive such as glue. In some embodiments, the liquid impermeable component may be stably associated with an inner wall of the delivery package in a manner sufficient to prevent the exposure of an individual handling the delivery package to the liquid of the container in the event the liquid breaches the disposal container. In some embodiments, the absorbent component may be associated with the liquid impermeable component, such as being provided on an interior facing surface of the liquid impermeable component. Suitable liquid impermeable materials include, but are not limited to, hydrophobic polymeric materials such as plastics including polystyrene, polypropylene, polymethylpentene, polytetrafluoroethylene (PTFE), perfluoroethers (PFE), fluorinated ethylene propylene (FEP), perfluoroalkoxy alkanes (PFA), polyethylene terephthalate (PET), polyethylene (PE), low-density polyethylene (LDPE), polyetheretherketone (PEEK), and the like.

Packaging the container may include positioning the disposal container inside of the delivery package. After the disposal container, including both the unwanted pharmaceutical formulation and the mitigation agent (in some embodiments, combined in an aqueous liquid) has been positioned into the delivery package, the delivery package may be sealed. The delivery package may be sealed in any suitable manner, which may depend in part on the nature of the delivery package. For example, where the delivery package includes a zipper type, this step may include sealing the zipper type seal by compressing the components of the seal together from one side of the seal to the other. In embodiments where the seal is an adhesive seal, this step may comprise pressing the seal against the delivery package or may comprise pressing adhesive components of the seal together. In these instances, a step may be required to prepare the adhesive seal before pressing the adhesive components of the seal together such as e.g., applying moisture to the adhesive seal or removing a release liner from the adhesive seal. In some embodiments the seal may be a tamper evident seal or may include a tamper evident label.

In some instances the delivery package is a pre-addressed package such as being provided with a pre-addressed label. Accordingly, when received by the subject or agent thereof practicing the method for unwanted pharmaceutical formulation disposal, the delivery package includes an address of a remote location to which the delivery package will be sent. In some instances the delivery package is a pre-paid package, i.e., a package that, when received by the subject or agent thereof practicing the method, is prepaid for shipping costs, such as postage costs, for shipping the package to the address of a remote location to which the delivery package will be sent. The delivery package may be configured for shipping by a governmental agency, such as the U.S. Postal service (USPS), or a private company, e.g., FEDEX, UPS or DHL.

Shipping

After combining the unwanted pharmaceutical formulation and pharmacological agent activity mitigation component in a disposal container and placing the disposal container in a delivery package, the delivery package may be given to a shipper by which the delivery package is configured to be shipped. "Shipper" refers to a person or company that sends or transports the delivery package by e.g., sea, land, or air to the recipient (e.g., the remote location, e.g., an operator thereof, to which the delivery package may be addressed).

The shipper may be a governmental agency, such as the U.S. Postal service (USPS), or a private company, e.g., FEDEX, UPS or DHL. In some embodiments, the subject or agent thereof may give the delivery package to the shipper by leaving the delivery package at any location wherein mail is regularly received from the USPS such as e.g., their home mailbox. In other embodiments, the subject or agent thereof may give the delivery package to the shipper by dropping the delivery package off at a pre-determined location such as a facility run by the shipper, or a secure container configured to collect the delivery package such as a drop box or mail collection box. In other embodiments, the subject or agent thereof may schedule the delivery package to be picked up by the shipper at a specified time and location.

After the delivery package has been given to the shipper, the subject or agent thereof and/or the recipient of the delivery package (i.e., the remote location, e.g., an operator thereof, to which the delivery package was addressed) may track the location of the delivery package as the delivery package travels from the subject or agent thereof to the recipient. In these embodiments, the delivery package may include a tracking indicia.

In some embodiments, the delivery package is assigned a unique tracking number and the tracking indicia is configured as a scannable element associated with the tracking number such as e.g., a barcode, RFID, or QR code. In these embodiments, the scannable element may be scanned by the shipper at one or more locations and/or times during the shipping process, such as when the delivery package is picked up, each time the delivery package enters and/or leaves a facility of the shipper (e.g., a truck, plane, office, sorting center, or other facility used by the shipper), and/or when the delivery package is delivered to its final destination (i.e., the remote location, e.g., an operator thereof). Each scan may result in tracking data. Examples of suitable tracking methods include, but are not limited to, those currently employed by USPS (e.g., USPS Tracking® and the components thereof), FedEx (e.g., FedEx® Delivery Manage or FedEx® Advanced Tracking and the components thereof), or UPS (e.g., UPS My Choice®, Quantum View®, or Flex™ Global View and the components thereof).

The tracking data may be accessible to the subject or agent thereof and/or the recipient of the delivery package. For example, the shipper can communicate tracking data with the subject or agent thereof and/or the recipient of the delivery package through a communication interface. In some embodiments, the tracking data may include the location and/or time of a scan, and/or calculated information such as an estimated time of arrival. In some embodiments, when the delivery package has reached its final destination, the tracking data may include proof of delivery such as e.g., a photo of the delivery package at the final destination, a signature of the recipient, or a final scan of the scannable element at the final destination. In some embodiments, tracking ceases after delivery of the delivery package at the final destination.

A communication interface for communicating tracking data from a shipper may include a receiver and/or transmitter for communicating with a network and/or another device, such as a network and/or device monitored by the subject or agent thereof and/or the recipient of the delivery package. The communication interface can be configured for wired or wireless communication, including, but not limited to, Global Positioning System (GPS) communication, radio frequency (RF) communication (e.g., Radio-Frequency Identification (RFID)), Zigbee communication protocols, Wi-Fi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured for infrared communication, Bluetooth® communication, or any other suitable wireless communication protocol to enable the shipper to communicate with other devices monitored by the subject or agent thereof and/or the recipient of the delivery package such as computer terminals and/or networks, communication enabled mobile telephones, personal digital assistants, or any other communication device.

In some embodiments, the communication interface is configured to provide a connection for data transfer (e.g., of the tracking data) utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot. In one embodiment, the shipper is configured to wirelessly communicate with the subject or agent thereof and/or the recipient of the delivery package via the communication interface, e.g., using a common standard such as 802.11 or Bluetooth® RF protocol, or an IrDA infrared protocol. The subject or agent thereof and/or the recipient of the delivery package may be monitoring another portable device, such as a smart phone, Personal Digital Assistant (PDA) or notebook computer; or a larger device such as a desktop computer, appliance, etc. In some embodiments, the communication interface is configured to automatically or semi-automatically communicate data stored by the shipper, e.g., in an optional data storage unit, with a network or server device using one or more of the communication protocols and/or mechanisms described above.

Upon receipt of the delivery package at the remote location, the delivery package and/or contents thereof may be disposed of in a manner that complies with relevant laws and regulations (e.g., local, state, and federal laws and regulations). For example, the remote location may be registered with the Drug Enforcement Administration (DEA) and the disposal process may comply with applicable DEA, Resource Conservation and Recovery Act (RCRA), and Environmental Protection Agency (EPA) requirements. In some instances, the remote location disposes of the delivery package and/or contents thereof by incinerating the package and/or contents thereof. In some embodiments, the package and/or contents thereof is incinerated in a combustor such as e.g., a large municipal waste combustor. In these embodiments, the energy released from the combustion of the delivery package may generate renewable energy and/or produce steam that may be used for heating. In some embodiments, the delivery package and/or contents thereof is further rendered non-retrievable by the remote location through e.g., a mechanical process prior to disposal or destruction (e.g., incineration). For example, the mechanical process may reduce the volume of the delivery package and/or contents thereof by compressing the package and/or contents thereof. In some embodiments, the arrival of delivery package is recorded by the remote location. In some embodiments, the delivery package is stored by the remote location for a period of time prior to disposal or destruction, e.g., in a DEA vault for controlled substance storage. For example, the delivery package and/or contents thereof may be stored by the remote location for a period ranging from 1 day to several weeks to several months prior to disposal. In some embodiments, the delivery package remains sealed throughout the destruction process. In some embodiments, the remote location verifies the delivery package has remained sealed throughout the delivery and/or disposal processes (e.g., by checking a tamper evident seal or label). In some embodiments, a witness of the remote location witnesses the disposal or destruction (e.g., incineration) of the delivery package and/or contents thereof. The witness of the remote location may then record the disposal or destruction (e.g., incineration) of the delivery package and/or contents thereof.

Systems

Systems for disposing of an unwanted pharmaceutical formulation are thus provided. In embodiments, the systems include: a disposal container configured to house the unwanted pharmaceutical formulation, a pharmacological agent activity mitigation component, and a delivery package configured to send the disposal container from a subject prescribed the unwanted pharmaceutical formulation to a remote location for disposal of the unwanted pharmaceutical formulation. In some embodiments, the systems further include: a tracking indicia configured to allow the delivery package to be tracked by the subject or agent thereof and/or the recipient of the delivery package, and a communication interface configured to allow the shipper to communicate tracking data to the subject or agent thereof and/or the recipient of the delivery package.

Use

The systems and methods for disposal of unwanted pharmaceutical formulations may be used to dispose of a variety of unwanted pharmaceutical compositions. Such unwanted pharmaceutical compositions may be liquids or solids. Solid pharmaceutical compositions may be pills, tablets, capsules, topical formulations such patches, etc., suppositories, among other forms. Liquid formulations may include syrups, elixirs, creams, ointments, etc., among other forms.

Methods and devices of the invention find use in disposing of any type of active agent in an unwanted pharmaceutical composition, including those that may be subject to abuse such opioids and other painkillers, in a manner that prevents abuse and is environmentally sound (e.g., in that it prevents the active agent from entering the ecosystem), that deters theft of the active agent prior to disposal, complies with all relevant laws and regulations, and/or prevents a subject prescribed the pharmaceutical formulation or an agent thereof, a shipping agent, or the recipient of the delivery package from being unwittingly exposed to the active agent during disposal.

Kits

Kits for use in practicing methods for disposing of an unwanted pharmaceutical formulation described herein are also provided. In certain embodiments, the kits include one or more components of the systems. For example, the kits may include a disposal container, such as a pouch or box, an amount of a pharmacological agent activity mitigation component such as in the form of a carbon pod, and a delivery package, such as a pre-addressed prepaid box or envelope, configured to send the disposal container to a remote location for disposal of the unwanted pharmaceutical formulation, e.g., as described above. These components may or may not be combined, such where the carbon pod is present in the pouch, and may or may not be present in combination with a pharmaceutical composition container (e.g., a pill vial or a blister pack), e.g., where the pouch and carbon pod are present in the pharmaceutical composition container box or the delivery package. In certain embodiments, the kits include additional components that find use in the methods, e.g., a tracking indicia configured to track the location of the delivery package as the delivery package travels from the subject or agent thereof to the recipient as described above, an amount of liquid, e.g., water, for introducing into the container etc., as described above, and/or an absorbent component to protect against potential spills as described above. In a given kit that includes two or more compositions, the compositions may be individually packaged or present within a common container, as desired.

In addition to the above-mentioned components, a subject kit may further include instructions for using the components of the kit, e.g., to practice the subject methods as described above. In some embodiments, the instructions may be unique to the specific kit, e.g., they may include a unique tracking number associated with the delivery package along with instructions on how to track the delivery package during the shipping process using the tracking number. The instructions are generally recorded on a suitable recording medium. The instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g., portable flash drive, CD-ROM, diskette, Hard Disk Drive (HDD) etc. In yet other embodiments, the actual instructions are not present in the kit, but means for obtaining the instructions from a remote source, e.g., via the internet, are provided. An example of this embodiment is a kit that includes a web address where the instructions can be viewed and/or from which the instructions can be downloaded. As with the instructions, this means for obtaining the instructions is recorded on a suitable substrate.

Customizable Systems

Custom sized pouches containing custom sized pods and/or custom amounts of a pharmaceutical agent activity mitigation component (e.g., activated carbon) that are shipped and provided separately to pharmacies/pharmacy benefit managers (PBMs) may be employed and combined by a pharmacy or PBM in order to provide a suitable system. Further, custom sized envelopes and boxes may be provided such as those supplied by; Sharps Compliance (Houston, TX), Stericycle (Bannockburn, IL), and American Rx Group (St. Cloud, MN).

Unwanted Pharmaceutical Formulations

Discussion will now be made of exemplary unwanted pharmaceutical formulations that may be disposed of using systems and methods as disclosed herein. It is to be appreciated that the disclosed systems and methods may be used with any suitable pharmaceutical composition and this discussion is for illustrative purposes only. Discussion is further made of containers holding the pharmaceutical composition for use. Such containers may be referred to a dosage containers and may be contrasted with disposal containers disclosed herein. In some embodiments, however, the dosage container may comprise the disposal container.

The nature of the unwanted pharmaceutical formulation may vary. For example, the dosage forms of the pharmaceutical compositions are not at all limited by the type of dosage formulation. For instance, the dosage forms of the pharmaceutical compositions may include any formulation configured to deliver an active pharmaceutical ingredient ("API") of a pharmaceutical composition to a subject. The dosage forms may vary depending on the intended route of administration of the pharmaceutical composition and API therein.

"Route of administration" refers to the way an API enters into a subject's system (e.g., how an API is taken into a subject's body). For example, routes of administration may include administrating a pharmaceutical composition and API therein orally, sublingually, topically, transdermally, rectally, vaginally, nasally, optically, by inhalation, and by injection. In some cases, dosage forms may be configured to be administered orally or sublingually. The dosage formulations may be configured as pills, tablets, capsules, films, syrups, liquids, gelcaps, elixirs, etc., among other forms. Alternatively, dosage forms may be configured to be administered topically or transdermally. Such dosage formulations may comprise creams, ointments, patches etc., among other forms. In other cases, dosage forms may be configured to be administered vaginally or rectally. Such dosage formulations may be configured as suppositories or liquids, among other forms. In yet other cases, dosage forms may be configured to be administered optically or nasally. Such dosage formulations may comprise liquids, such as drops, among other forms. Alternatively, dosage forms may be configured to be administered by inhalation and may be formulated as a liquid or a gas. In other cases, dosage forms may be configured to be administered by injection such as by subcutaneous, intravenous, intradermal, or intramuscular injections and may be formulated as a liquid.

The dosage forms of the pharmaceutical compositions may be loose (i.e., not positioned within a container or free-flowing relative to the external environment). Alternatively, the dosage forms of the pharmaceutical compositions may be positioned within a dosage container (also referred to as pharmaceutical composition container). The dosage container may be the container in which the pharmaceutical drug formulations (also referred to as dosage formulations) were originally received by a subject.

Where the dosage forms of the pharmaceutical compositions are positioned within a dosage container, the configuration of the container may vary. More specifically, the container may vary depending on the dosage form of the pharmaceutical composition. For instance, when the dosage formulation of the pharmaceutical composition includes, pills, tablets, capsules, or gelcaps, the container may be configured as a pill vial, pill wheel, or pill box. Alternatively, where the dosage formulation of the pharmaceutical composition includes liquids, syrups, or ointments, the container may be configured as a bottle or a tube, such as a squeezable tube.

The dosage container for the pharmaceutical composition may vary depending on the intended route of administration of the dosage formulation and API therein. For instance, where the route of administration of the dosage formulation is transdermal or topical, such as a patch or ointment, the container may be configured to prevent accidental exposure to the formulation and API thereof. Alternatively, where the route of administration of a dosage formulation is through inhalation, the container may be configured as an aerosol canister, such as a canister compatible with an inhaler. Where the route of administration of the dosage formulation is through injection, the container may be configured as a syringe.

In some cases, the dosage formulations may be stably associated with another component of the container, e.g., a wall of the container, a solid support in the container, or a pouch inside of the container. In other cases, the container may be configured as a blister or blisters of a blister pack and the dosage formulations may be provided in compartments of the blister pack.

The phrase "blister pack" is used herein in its conventional sense to refer to a pharmaceutical composition package that includes one or more individually sealed containers each containing a pharmaceutical composition. In some embodiments, unwanted pharmaceutical formulation may be present in a blister pack, e.g., as described in published United States patent application publication no. US 2019-0291152 A1 and now issued as U.S. Pat. No. 11,389,844, the disclosure of which is herein incorporated by reference.

Aspects of blister packs include a first blister component defining one or more pharmaceutical composition containers in the form of blisters (i.e., compartments, e.g., in the form of pockets, wells, cavities, etc.) and a second backing component that, when complexed with the blister component, serves to seal the interior of the blister(s) and contents thereof, e.g., pharmaceutical compositions, from the external environment. The blister component may include one or more compartments as desired, wherein the number ranges in some instances from 1 to 100, such as 2 to 50, including 5 to 25 blisters. The blister component of the blister pack may be fabricated from any convenient material, wherein in some instances the blister component is fabricated from a formable web material, such as a transparent polymeric material, e.g., polyvinyl chloride (PVC), wherein the web material may include one or more additional polymeric layers (e.g., where the web materials is laminate), and wherein such additional polymeric materials may include Polyvinylidene chloride (PVDC), Polychlorotrifluoro ethylene (PCTFE) and Cyclic olefin copolymers (COC) or polymers (COP). Blister components may also be fabricated from cold form foil, such a 3-layer laminate: PVC/Aluminum/Polyamide. The backing component may be fabricated from any convenient material, such as a paperboard or a lidding foil, e.g., a hard temper aluminum, which may or may not be coated with a heat-seal lacquer on the inside and/or a print primer on the outside.

The blister pack may include a water-soluble component such as a water-soluble blister component and/or water-soluble backing component. Any suitable water-soluble material may be employed. Examples of suitable water-soluble materials include polymers and compositions thereof, where such polymers may be water soluble starches or modified starch polymers, soluble polyesters or polyvinyl alcohol or blends of these polymers with natural polymers such as starch or modified starch. In some cases, optional film additives for providing various functionalities may be included. The film composition and film can thus contain one or more auxiliary film agents and processing agents, such as, but not limited to, plasticizers, lubricants, release agents, fillers, extenders, antiblocking agents, detackifying agents, antifoams and other functional ingredients, in amounts suitable for their intended purpose. Specific optional additives that may be present include gelatin, lecithin, such as sunflower lecithin, sorbitol, glycerol, propylene glycol, polysorbate 80, sodium lauryl sulfate, and combinations thereof. Further details regarding water-soluble materials and blister pack components fabricated therefrom are provided in U.S. Patent Application Publication Nos. 2006/0260973 and 2009/0134054, the disclosures of which are herein incorporated by reference.

The container of the pharmaceutical composition may vary depending on the API of the pharmaceutical composition. For instance, where the API is unstable or labile as a result of specific environmental factors or conditions, the container may be configured to protect the API against such specific environmental factors or conditions. For example, if the API degrades in the presence of light (i.e., is photo unstable) the container may be opaque, or if the API degrades in the presence of moisture the container may be moisture-proof.

The nature of the unwanted pharmaceutical formulation that may be disposed of using systems and methods as described herein may vary. For example, the dosage forms of the pharmaceutical compositions may not be limited by the type of active pharmaceutical ingredient ("API") used therein. APIs include, without limitation, opiates, drugs used in psychiatry or in the treatment of schizophrenia, cytotoxic substances, analgesics, anti-inflammatories, antipyretics, antibiotics, antimicrobials, anxiolytics, laxatives, anorexics, antihistamines, antidepressants, anti-asthmatics, antidiuretics, anti-flatulents, antimigraine agents, antispasmodics, sedatives, anti-hyperactives, antihypertensives, tranquilizers, decongestants, beta blockers, peptides, proteins, oligonucleotides and other substances of biological origin, and combinations thereof. U.S. Pat. No. 5,234,957 to Mantelle, columns 18 through 21 describes other drugs and pharmaceutically active ingredients that may be disposed of using the systems and methods described herein. Mantelle is hereby incorporated by reference in its entirety. Any of the forgoing APIs can be used in the form of any salt, hydrate, solvate, polymorph, or individual optical isomer, and any mixture thereof.

In some instances, the pharmaceutical composition includes drugs used to treat pain such as, e.g., opiates. Opiates are given to patients for a variety of reasons, most frequently for pain mitigation of one type or another. Legal opiates which may be disposed of using systems and methods as disclosed herein include prescription drugs such as, without limitation, alfentanil, alphaprodine, anileridine, benzylmorphine, bezitramide, buprenorphine, butorphanol, clonitazene, codeine, codeine phosphate, desomorphine, dextromoramide, dezocine, diampromide, dihydrocodeine, dihydrocodeinone enol acetate, dihydromorphine, dimenoxadol, dimepheptanol, dimethylthiambutene, dioxaphetyl butyrate, dipipanone, eptazocine, ethoheptazine, ethylmethylthiambutene, ethylmorphine, etonitazene, fentanyl, hydrocodone, hydromorphone, hydroxypethidine, isomethadone, ketobemidone, levorphanol, lofentanil, meperidine, meptazinol, metazocine, methadone, metopon, morphine, morphine hydrochloride, morphine sulfate, myrophine, nalbuphine, narceien, nicomorphine, norlevorphanol, normethadone, normorphine, norpipanone, opium, oxycodone, oxymorphone, papveretum, pentazocine, phenadoxone, phenazocine, phenoperidine, piminodine, piritramide, proheptazine, promedol, propirm, propoxyphene, remifentanil, sufentanil and tilidine. The class of compounds generally known as opiates also includes illicit drugs such as heroin and cocaine. In general, opiates that may be disposed of using systems and methods as described herein include those identified above as well as any listed as controlled substances pursuant to 21 C.F.R. § 1308.12.

In some instances, the pharmaceutical composition for disposal includes drugs used in psychiatry or in the treatment of schizophrenia. Such drugs, include, but are not limited to: i) selective serotonin reuptake inhibitors (SSRIs) such as, e.g., citalopram, dapoxetine, escitalopram, fluoxetine, fluvoxamine, paroxetine, sertraline and vortioxetine; ii) serotonin-norepinephrine reuptake inhibitors (SNRIs) such as, e.g., desvenlafaxine, duloxetine, levomilnacipran, milnacipran and venlafaxine; iii) sedatives such as, e.g., barbiturates (e.g., phenobarbital, amobarbital, butalbital, and pentobarbital), benzodiazepines (e.g., diazepam, alprazolam, clonazepam, and lorazepam) and hypnotics (e.g., zolpidem, eszopiclone and zaleplon); iv) antipsychotics such as, e.g., aripiprazole, aripiprazole lauroxil, asenapine, brexpiprazole, cariprazine, clozapine, iloperidone and lumateperone; and v) drugs used to treat ADHD or ADD such as, e.g., methylphenidate-based and amphetamine-based drugs, tomoxetine, and antihypertensives.

In some instances, the pharmaceutical composition includes a cytotoxic substance, i.e., an agent that kills cells. These substances are generally used in the treatment of malignant and other diseases. They are designed to destroy rapidly growing cancer cells. They have been shown to be mutagenic, carcinogenic and/or teratogenic, either in treatment doses or animal and bacterial assays. Cytotoxic drugs that interfere with critical cellular processes including DNA, RNA, and protein synthesis, have been conjugated to antibodies and subsequently used for in vivo therapy. Such drugs, include, but are not limited to: i) intercalating agents, in particular doxorubicin (Adriamycin), daunorubicin, epirubicin, idarubicin, zorubicin, aclarubicin, pirarubicin, acridine, mitoxanthrone, actinomycin D, eptilinium acetate; ii) alkylating agents chosen from platinum derivatives (cisplatin, carboplatin, oxaliplatin); iii) a compound chosen from the other groups of alkylating agents: cyclophosphamide, ifosfamide, chlormetrine, melphalan, chlorambucil, estramustine, busulfan, mitomycin C, nitrosoureas: BCNU (carmustine), CCNU (lomustine), fotemustine, streptozotocin, triazines or derivatives: procarbazine, dacarbazine, pipobroman, ethyleneimines: altretamine, triethylene-thio-phosphoramide, iv) a compound chosen from the other groups of anti-metabolic agents: antifolic agents: methotrexate, raltitrexed, antipyrimidine agents: 5-fluorouracil (5-FU), cytarabine (Ara-C), hydroxyurea antipurine agents: purinethol, thioguanine, pentostatin, cladribine, cytotoxic nucleoside synthesis inducers: gemcitabine, v) a compound chosen from the other groups of tubulin-affinity agents, vinca alkaloids which disrupt the mitotic spindle: vincristine, vinblastine, vindesine, navelbine, agents which block the depolymerization of the mitotic spindle: paclitaxel, docetaxel, agents which induce DNA cleavage by inhibition of topoisomerase II: etoposide, teniposide, topoisomerase I inhibitors which induce DNA cleavage: topotecan, irinotecan, vi) a DNA splitting or fragmenting agent, such as bleomycin, vii) one of the following compounds: plicamycin, L-asparaginase, mitoguazone, dacarbazine, viii) an anticancer progestative steroid; medroxy-progesterone, megestrol, ix) an anticancer estrogen steroid: diethylstilbestrol; tetrasodium fosfestrol, x) an antiestrogen agent: tamoxifen, droloxifen, raloxifen, aminoglutethimide, xi) a steroidal antiandrogenic agent (e.g. cyproterone) or a non-steroidal antiandrogenic agent (flutamide, nilutamide).

Dosage forms of unwanted pharmaceutical formulations for disposal using systems and methods as disclosed herein can, in addition or instead, include vitamins, minerals and dietary supplements. As used in this disclosure, the term "vitamin" refers to trace organic substances that are required in the diet. The term "vitamin(s)" includes, without limitation, thiamine, riboflavin, nicotinic acid, pantothenic acid, pyridoxine, biotin, folic acid, vitamin B12, lipoic acid, ascorbic acid, vitamin A, vitamin D, vitamin E and vitamin K. Also included within the term "vitamin" are the coenzymes thereof. Coenzymes are specific chemical forms of vitamins. Coenzymes include thiamine pyrophosphates (TPP), flavin mononucleotide (FMM), flavin adenine dinucleotide (FAD), Nicotinamide adenine dinucleotide (NAD), Nicotinamide adenine dinucleotide phosphate (NADP), Coenzyme A (CoA), pyridoxal phosphate, biocytin, tetrahydrofolic acid, coenzyme B.sub.12, lipoyllysine, 11-cis-retinal, and 1,25-dihydroxycholecalciferol. The term "vitamin(s)" also includes choline, carnitine, and alpha, beta, and gamma carotenes. The term "mineral" refers to inorganic substances, metals, and the like required in the human diet. Thus, the term "mineral" as used herein includes, without limitation, calcium, (calcium carbonate), iron, zinc, selenium, copper, iodine, magnesium, phosphorus, chromium and the like, and mixtures thereof. The term "dietary supplement" as used herein means a substance which has an appreciable nutritional effect when administered in small amounts. Dietary supplements include, without limitation, such ingredients as bee pollen, bran, wheat germ, kelp, cod liver oil, ginseng, and fish oils, amino-acids, proteins and mixtures thereof. As will be appreciated, dietary supplements may incorporate vitamins and minerals.

In general, the amount of active ingredient incorporated in each dosage form, such as a tablet, may be selected according to known principles of pharmacy. A patient is generally prescribed an effective amount (also referred to as a "pharmaceutically effective amount") of API sufficient to elicit a required or desired therapeutic response. As used with reference to a vitamin or mineral, the term "effective amount" means an amount at least about 10% of the United States Recommended Daily Allowance ("RDA") of that particular ingredient for a patient. For example, if an intended ingredient is vitamin C, then an effective amount of vitamin C would include an amount of vitamin C sufficient to provide 10% or more of the RDA. Typically, where the tablet includes a mineral or vitamin, it will incorporate higher amounts, such as about 100% or more of the applicable RDA.

The amount of active ingredient used can vary greatly. The size of the dosage form, the requirements of other ingredients, and the number of, for example, tablets which constitute a single dose can all impact the amount of pharmacologically active ingredient which can be used. In some instances, the active ingredient may be provided in an amount of between greater than zero and about 80% by weight of the finished tablet and, such as in a range of between greater than zero and about 60% by weight thereof. Put in other terms, the active ingredient can be included in an amount of between about 1 microgram to about 2 grams, such as between about 0.01 and about 1000 milligrams per dosage form, i.e., per tablet.

Aspects of methods for disposing off an unwanted pharmaceutical formulation include: combining the unwanted pharmaceutical formulation with a pharmacological agent activity mitigation component in a container and packaging the container in a delivery package configured to send the container to a remote location for disposal of the unwanted pharmaceutical formulation, wherein the combining and packaging steps are performed by a subject prescribed the pharmaceutical formulation (or an agent thereof such as a spouse or caregiver).

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing various embodiments of the invention, aspects of embodiments of the methods are reviewed first in greater detail, followed by a detailed description of embodiments of systems and kits that find use in practicing methods of the invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A system for disposing of an unwanted pharmaceutical formulation and for providing such system to a user, the system comprising:
   a disposal container comprising a pouch;
   a pharmacological agent activity mitigation component provided in a water-soluble pod, wherein the a water-soluble pod is generally flat and comprises two tandem pods each containing the pharmacological agent activity mitigation component; and
   a mailer, wherein the mailer meets the requirements for a United States Postal Service automation flat,
   wherein pouch is preloaded with the pharmacological agent activity mitigation component, and wherein the pouch includes a fold generally center to the pods.

2. The system of claim 1, wherein the pharmacological agent activity mitigation component is activated carbon.

3. The system of claim 1, wherein the mailer comprises cardstock and an overwrap, and wherein the cardstock is folded over the pouch.

4. The system of claim 1, wherein the pharmacological agent activity mitigation component is a sequestering agent.

5. A method of disposing of an unwanted pharmaceutical formulation, the method comprising:
   receiving a disposal container comprising a pouch and a pharmacological agent activity mitigation component provided in a water-soluble pod, comprising a pouch;
   wherein the a water-soluble pod is generally flat and comprises two tandem pods each containing the pharmacological agent activity mitigation component, wherein pouch is preloaded with the pharmacological agent activity mitigation component, and wherein the pouch includes a fold generally center to the pods;
   wherein receiving comprises receiving a mailer housing the disposal container, and wherein the mailer meets the requirements for a United States Postal Service automation flat;
   combining the unwanted pharmaceutical formulation and the pharmacological agent activity mitigation component in the disposal container; and
   sealing the disposal container.

6. The method of claim 5, wherein the pharmacological agent activity mitigation component is activated carbon.

7. The method of claim 5, wherein the mailer comprises cardstock and an overwrap.

8. The method of claim 5, further comprising adding liquid to the unwanted pharmaceutical formulation and the pharmacological agent activity mitigation component in the disposal container.

9. The method of claim 5, wherein the disposal container comprises a pouch, and wherein the mailer comprises cardstock folded over the pouch.

* * * * *